US009685002B2

(12) United States Patent
Goto et al.

(10) Patent No.: US 9,685,002 B2
(45) Date of Patent: Jun. 20, 2017

(54) INFORMATION PROCESSING APPARATUS AND INFORMATION PROCESSING SYSTEM HAVING A MARKER DETECTING UNIT AND AN EXTRACTING UNIT, AND INFORMATION PROCESSING METHOD BY USING THE SAME

(71) Applicant: Sony Corporation, Tokyo (JP)

(72) Inventors: Tetsuro Goto, Tokyo (JP); Masatoshi Ueno, Kanagwa (JP); Kenichi Kabasawa, Saitama (JP); Toshiyuki Nakagawa, Kanagawa (JP); Daisuke Kawakami, Kanagawa (JP); Shinobu Kuriya, Kanagawa (JP); Tsubasa Tsukahara, Tokyo (JP); Hisako Sugano, Kanagawa (JP)

(73) Assignee: Sony Corporation, Tokyo (JP)

( * ) Notice: Subject to any disclaimer, the term of this patent is extended or adjusted under 35 U.S.C. 154(b) by 386 days.

(21) Appl. No.: 13/852,656

(22) Filed: Mar. 28, 2013

(65) Prior Publication Data

US 2013/0265330 A1 Oct. 10, 2013

(30) Foreign Application Priority Data

Apr. 6, 2012 (JP) .................................. 2012-087184

(51) Int. Cl.
*G06T 19/00* (2011.01)
*G06F 3/01* (2006.01)
(Continued)

(52) U.S. Cl.
CPC .......... *G06T 19/006* (2013.01); *G02B 27/017* (2013.01); *G02B 27/0172* (2013.01);
(Continued)

(58) Field of Classification Search
None
See application file for complete search history.

(56) References Cited

U.S. PATENT DOCUMENTS 6,335,731 B1 * 1/2002 Yamamoto .............. A63F 13/10
345/419
8,654,120 B2 * 2/2014 Beaver, III ......... G06Q 30/0643
345/419

(Continued)

FOREIGN PATENT DOCUMENTS

JP 07-129322 A 5/1995
JP 07129322 A 5/1995

(Continued)

OTHER PUBLICATIONS

Office Action Received for Japanese Patent Application No. 2012-087164 mailed on Dec. 22, 2015.

(Continued)

*Primary Examiner* — Maurice L McDowell, Jr.
*Assistant Examiner* — Donna J Ricks
(74) *Attorney, Agent, or Firm* — Chip Law Group

(57) ABSTRACT

Provided is an information processing apparatus, including: an image-taking unit configured to take an image of real scenery to thereby obtain real image; a marker-detecting unit configured to extract a marker image from the real image, the marker image being an image of marker projection light, the marker projection light being projected by a projection device to the real scenery in order to provide spatial first information, the first information being necessary to display virtual information such that the virtual information is superimposed on the real scenery, second information being added to the marker projection light; and an extracting unit configured to extract the second information added to the extracted marker image.

19 Claims, 15 Drawing Sheets

(51) Int. Cl.
*G02B 27/01* (2006.01)
*G06F 3/0346* (2013.01)
*G06T 7/11* (2017.01)

(52) U.S. Cl.
CPC ............ *G06F 3/011* (2013.01); *G06F 3/0346* (2013.01); *G06T 7/11* (2017.01); *G02B 2027/014* (2013.01); *G02B 2027/0138* (2013.01); *G06F 2203/04806* (2013.01); *G06T 2207/30204* (2013.01)

(56) References Cited

U.S. PATENT DOCUMENTS

| | | | |
|---|---|---|---|
| 2005/0256395 A1* | 11/2005 | Anabuki | G06T 7/0018 600/414 |
| 2007/0072674 A1* | 3/2007 | Ohta et al. | 463/37 |
| 2008/0267450 A1* | 10/2008 | Sugimoto et al. | 382/103 |
| 2011/0188760 A1 | 8/2011 | Wright et al. | |
| 2012/0327117 A1* | 12/2012 | Weller et al. | 345/633 |
| 2013/0100009 A1* | 4/2013 | Willis et al. | 345/156 |

FOREIGN PATENT DOCUMENTS

| | | | | |
|---|---|---|---|---|
| JP | 07-272623 | | 10/1995 | |
| JP | 2011186756 A | | 9/2001 | |
| JP | 2002-092647 A | | 3/2002 | |
| JP | 2002278698 A | | 9/2002 | |
| JP | 2004-145448 A | | 5/2004 | |
| JP | 2005062748 A | | 3/2005 | |
| JP | 2007-075213 | | 3/2007 | |
| JP | 2007-272623 | * | 10/2007 | ............ G06T 17/40 |
| JP | 2007-272623 A | | 10/2007 | |

OTHER PUBLICATIONS

Tomoaki Adachi, A High Immersive Tele-directing System Projecting Annotations on the Real World, Technical Research Report of Institute of Electronics, Information and Communication Engineers, vol. 104, No. 390, Japan, Institute of Electronics, Information and Communication Engineers, Jul. 11, 2003, IE2003-41, PRMU2003-71, MVE2003-53, p. 83-86.

Office Action for CN Patent Application No. 201310109389.9, issued on Nov. 3, 2016, 9 pages of Office Action and 6 pages of English Translation.

Office Action for JP Patent Application No. 2016-072692, issued on Feb. 21, 2017, 5 pages of Office Action and 5 pages of English Translation.

Shin, et al., "An Interactive Hand Pointer that Projects a Mark in the Real Work Space", T. IEE, Japan, vol. 121-C, No. 9, 2001, pp. 1464-1470.

* cited by examiner

INFORMATION PROCESSING APPARATUS AND INFORMATION PROCESSING SYSTEM HAVING A MARKER DETECTING UNIT AND AN EXTRACTING UNIT, AND INFORMATION PROCESSING METHOD BY USING THE SAME

CROSS REFERENCES TO RELATED APPLICATIONS

The present application claims priority to Japanese Priority Patent Application JP 2012-087184 filed in the Japan Patent Office on Apr. 6, 2012, the entire content of which is hereby incorporated by reference.

BACKGROUND

The present disclosure relates to an information processing apparatus, an information processing method, and an information processing system configured to display an image such that the image is superimposed on real scenery.

There is known a technology called augmented reality (AR). According to the AR technology, an image appropriate to real scenery is added to an image of the real scenery. According to the AR technology, a camera or the like obtains an image of real scenery. Virtual information is displayed such that the virtual information is superimposed on the obtained image of real scenery. A user watches the virtual information, which is displayed such that the virtual information is superimposed on the real scenery. As a result, the user recognizes as if an object displayed as virtual information exists in the real scenery.

The AR technology includes a marker-type AR technology and a markerless-type AR technology.

According to the marker-type AR technology, image information of a marker (for example, colored square having predetermined size) is previously registered. The marker is physically installed in real scenery. An image of real scenery is taken whereby an image of the real scenery (real image) is obtained. A marker is detected from the real image. Spatial positional relation between the marker and an image-taking device is calculated based on information such as the size, angle, and the like of the detected marker. Based on the spatial positional relation between the marker and the image-taking device, the display position and the display angle of virtual information are calculated. The virtual information is displayed on a display device based on the calculated display position and display angle. The relative position between the display device and the image-taking device is fixed. A user is capable of visually recognizing the virtual information with real scenery (for example, see Japanese Patent Application Laid-open No. 2007-75213.).

Meanwhile, according to the markerless-type AR technology, a particular marker is not used. An object or real scenery itself in real image is spatially recognized. Based on information such as the size, angle, and the like of the object, the spatial positional relation between the object and an image-taking device is calculated. Based on the positional relation, the display position and the display angle of the virtual information are calculated. The virtual information is displayed on a display device. The relative position between the display device and the image-taking device is fixed. A user is capable of visually recognizing the virtual information with real scenery.

SUMMARY

According to the marker-type AR technology, the display position and the display angle of virtual information are calculated based on a marker, which exists in real scenery. Because of this, the marker-type AR technology has a merit in which it is possible to calculate the display position and the display angle of virtual information relatively easily. Meanwhile, the marker-type AR technology has the following demerits. For example, it requires time and effort to create markers. It is necessary to secure marker-installation space. The quality of markers is declined as time passes. Physical and psychological stress is caused by markers existing in real scenery. There are limitations on design of markers.

To the contrary, the markerless-type AR technology has the following merits. That is, it is not necessary to create and install markers. It is possible to apply the markerless-type AR technology to a location in which markers should not be installed. Meanwhile, the markerless-type AR technology has the following demerits. For example, complicated calculation is executed to construct a wide space model in the vicinity of displayed virtual information. High arithmetic capacity is required, and, if arithmetic capacity is inadequate, it is difficult to ensure stability and high accuracy, and calculation may be delayed.

Further, both the marker-type AR technology and the markerless-type AR technology have the following problems.

1. It is difficult for a user to control (move to different position, zoom, rotation, and the like) virtual information at will. That is, it is necessary for a user to stop to use an apparatus once, to move the position of an existing marker (in case of marker-type AR technology), and to change the display position of virtual information by means of a program.

2. A visible-light camera recognizes an image. Because of this, it is not possible to recognize an image in an extremely blight place and in an extremely dark place. In addition, an object shields a light source (sun, electric light, etc.), and a dark shadow (contrast) is thus generated on the surface of an existing object, which is also problematic.

As described above, the marker-type AR technology and the markerless-type AR technology have both merits and demerits. There is room for improvement in preparation for practical use.

In view of the above-mentioned circumstances, it is desirable to display virtual information stably and with a high degree of accuracy.

According to an embodiment of the present application, there is provided an information processing apparatus, including: an image-taking unit configured to take an image of real scenery to thereby obtain real image; a marker-detecting unit configured to extract a marker image from the real image, the marker image being an image of marker projection light, the marker projection light being projected by a projection device to the real scenery in order to provide spatial first information, the first information being necessary to display virtual information such that the virtual information is superimposed on the real scenery, second information being added to the marker projection light; and an extracting unit configured to extract the second information added to the extracted marker image.

A measurable characteristic may be added to the marker projection light as the second information, and the extracting unit may be configured to measure the characteristic based on an image of the marker projection light, and to extract the second information.

The measurable characteristic of the marker projection light may be at least one of light intensity (amplitude), wavelength (frequency), and blinking periods.

The information processing apparatus may further include an image generating unit configured to generate, based on the first information, an image of virtual information displayed such that the virtual information is superimposed on the real scenery.

The second information may be identification information uniquely identifying the projection device, the extracting unit may be configured to determine if the extracted identification information indicates that the projection device projects a display target of virtual information, and the image generating unit may generate, if the extracting unit determines that the extracted identification information indicates that the projection device projects a display target of virtual information, an image of the virtual information.

The information processing apparatus may further include a filter capable of detecting a characteristic of the marker projection light. The marker-detecting unit may be configured to detect a marker image from the filtered real image.

The information processing apparatus may further include a display unit configured to display an image of the virtual information such that the image of the virtual information is superimposed on the real scenery.

The second information may be configuration changing information of virtual information displayed such that the virtual information is superimposed on the real scenery, and the image generating unit may be configured to generate an image of the virtual information based on the configuration changing information of virtual information extracted by the extracting unit.

The information processing apparatus may further include a sending unit configured to send the second information to the projection device, the second information being added to a marker image by the projection device. The second information added to a marker image by the projection device may be obtained by modulating the second information into the marker projection light to thereby add the second information to the marker image, the second information being received by the projection device from the information processing apparatus, and the extracting unit may be configured to demodulate the second information added to the marker image.

The second information may be location information, the location information specifying a location, object data to be displayed as virtual information being stored in the location, and the information processing apparatus may further include an object data obtaining unit, the object data obtaining unit being configured to obtain, based on the location information extracted by the extracting unit, object data to be displayed as virtual information.

According to an embodiment of the present application, there is provided an information processing method, including: taking, by an image-taking unit, an image of real scenery to thereby obtain real image; extracting, by a marker-detecting unit, a marker image from the real image, the marker image being an image of marker projection light, the marker projection light being projected by a projection device to the real scenery in order to provide spatial first information, the first information being necessary to display virtual information such that the virtual information is superimposed on the real scenery, second information being added to the marker projection light; and extracting, by an extracting unit, the second information added to the extracted marker image.

According to an embodiment of the present application, there is provided an information processing system, including: a projection device capable of projecting a marker to real scenery, second information being added to the marker; and an information processing apparatus including an image-taking unit configured to take an image of the real scenery to thereby obtain real image, a marker-detecting unit configured to extract a marker image from the real image, the marker image being an image of marker projection light, the marker projection light being projected by a projection device to the real scenery in order to provide spatial first information, the first information being necessary to display virtual information such that the virtual information is superimposed on the real scenery, second information being added to the marker projection light, and an extracting unit configured to extract the second information added to the extracted marker image.

The information processing apparatus may further include a sending unit configured to send the second information to the projection device, the second information being added to a marker image by the projection device, the projection device may include a receiving unit configured to receive the second information from the information processing apparatus, and a modulation unit configured to modulate the second information received by the receiving unit into the marker projection light to thereby add the second information to a marker image, and the extracting unit may be configured to demodulate the second information added to the marker image.

As described above, according to the present application, it is possible to display virtual information stably and with a high degree of accuracy.

Additional features and advantages are described herein, and will be apparent from the following Detailed Description and the figures.

DETAILED DESCRIPTION

Hereinafter, an embodiment of the present disclosure will be described with reference to the drawings.

<First Embodiment>

[Gist of First Embodiment]

Figure 1:
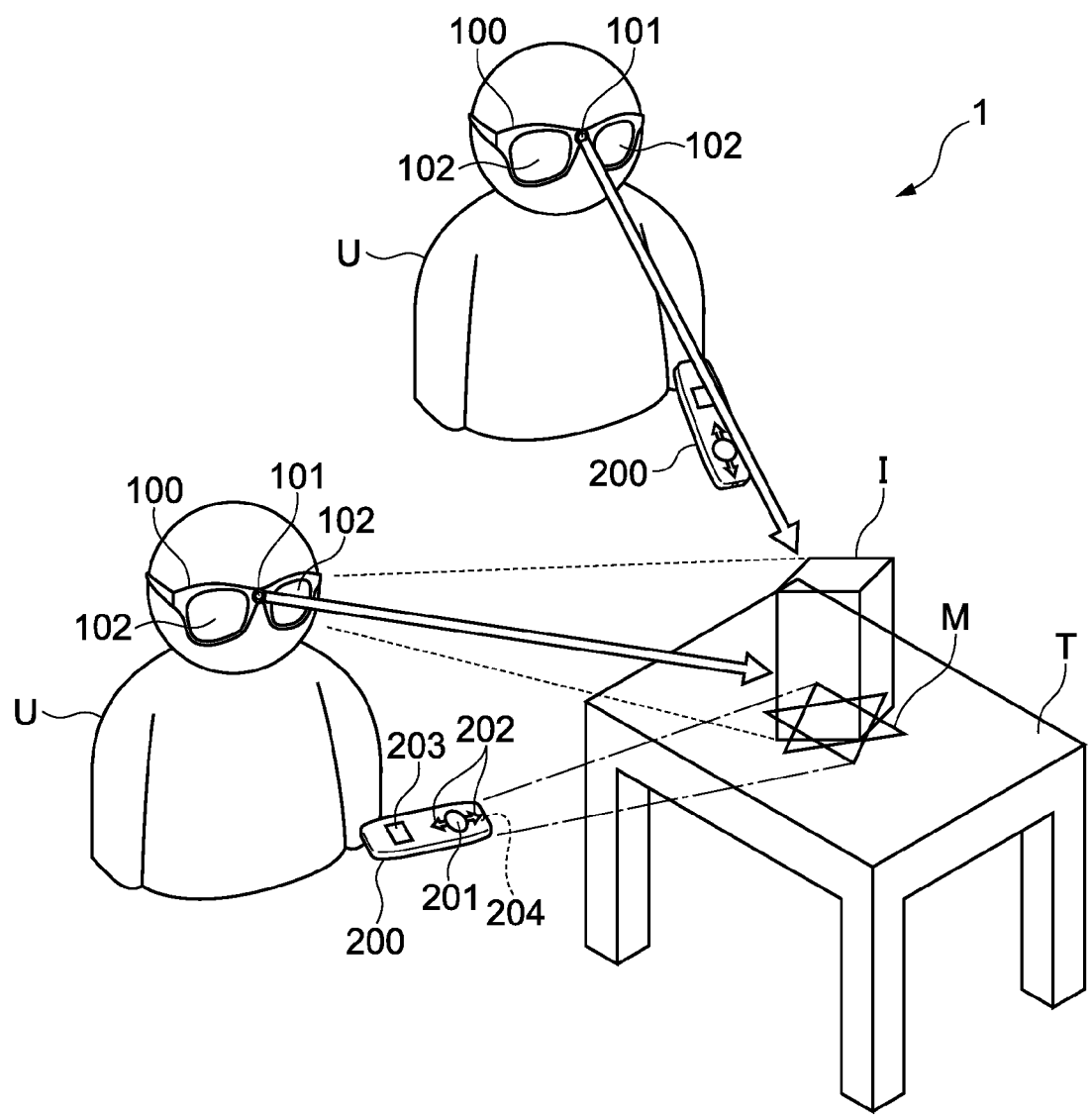
FIG. 1 is a schematic diagram showing an information processing system according to a first embodiment of the present application.

FIG. 1 is a schematic diagram showing an information processing system 1 according to a first embodiment of the present application.

The information processing system 1 of this embodiment includes at least one Head Mount Display (HMD) 100 (information processing apparatus) and at least one input device 200 (projection device).

The shape of the HMD 100 is similar to glasses as a whole. A user U wears the HMD 100 on his head. The HMD 100 includes a display unit 102 and an image-taking unit 101. The display unit 102 is arranged in front of the eyes of the user U when the user U wears the HMD 100. The image-taking unit 101 is capable of taking an image of at least a field of vision of the user U in real scenery. The display unit 102 has permeability. The display unit 102 allows the user U himself to visually recognize real scenery through the display unit 102. At the same time, the display unit 102 is capable of displaying an image such that the image is superimposed on the real scenery, which the user U visually recognizes. The HMD 100 detects a marker M in an image of real scenery (real image) taken by the image-taking unit 101. The marker M is projected on the real scenery by the input device 200. The input device 200 projects the marker M to provide spatial information (first information) necessary to display virtual information such that the virtual information is superimposed on the real scenery. The HMD 100 calculates a superimposition parameter of virtual information I based on the detected marker M. The "superimposition parameter" is a parameter of a configuration of virtual information displayed such that the virtual information is superimposed on real scenery. Specifically, the "superimposition parameter" includes the position, size, and angle of the virtual information I. The HMD 100 generates predetermined virtual information based on the calculated superimposition parameter. The display unit 102 displays the virtual information I such that the virtual information I is superimposed on the marker M, which is projected on real scenery visually recognized by the user U. The user previously inputs selection of content to be displayed as the virtual information I by means of an input unit (FIG. 2) of the HMD 100.

The input device 200 has a size and a shape such that the user U grasps the input device 200 with his hand. The input device 200 includes a projection button 201, zoom sliders 202, and a power button 203. When the user U presses the projection button 201, a projection window 204 projects a graphic having a predetermined shape on a projection target object T (desk, etc.) in real scenery. The graphic is the marker M, which provides spatial information (first information) necessary to display virtual information such that the virtual information is superimposed on the real scenery. The projection position of the marker M is the display position of the virtual information I displayed by the HMD 100. In addition, the user U moves the input device 200 while holding down the projection button 201. As a result, the user U is capable of controlling the virtual information I. For example, the user U moves the input device 200 while holding down the projection button 201 to thereby move the projection position of the marker M. As a result, the virtual information I moves (is dragged). Similarly, the user U rotates the input device 200 while holding down the projection button 201 to thereby rotate the marker M. As a result, the virtual information I rotates. Further, the user U operates the zoom sliders 202 while holding down the projection button 201. As a result, the virtual information I is enlarged/reduced (zoomed). The user U wishes to display other new virtual information while the virtual information I is being displayed. In this case, the user U stops pressing the projection button 201. Then, the user U inputs selection of content to be displayed as the new virtual information by using the input unit (FIG. 2) of the HMD 100. Further, the user U stops pressing the projection button 201 and then presses the projection button 201 again, to thereby superimpose the marker M on the displayed virtual information I. Then, the user U is capable of operating the virtual information I again.

[Hardware Configuration of HMD]

Figure 2:
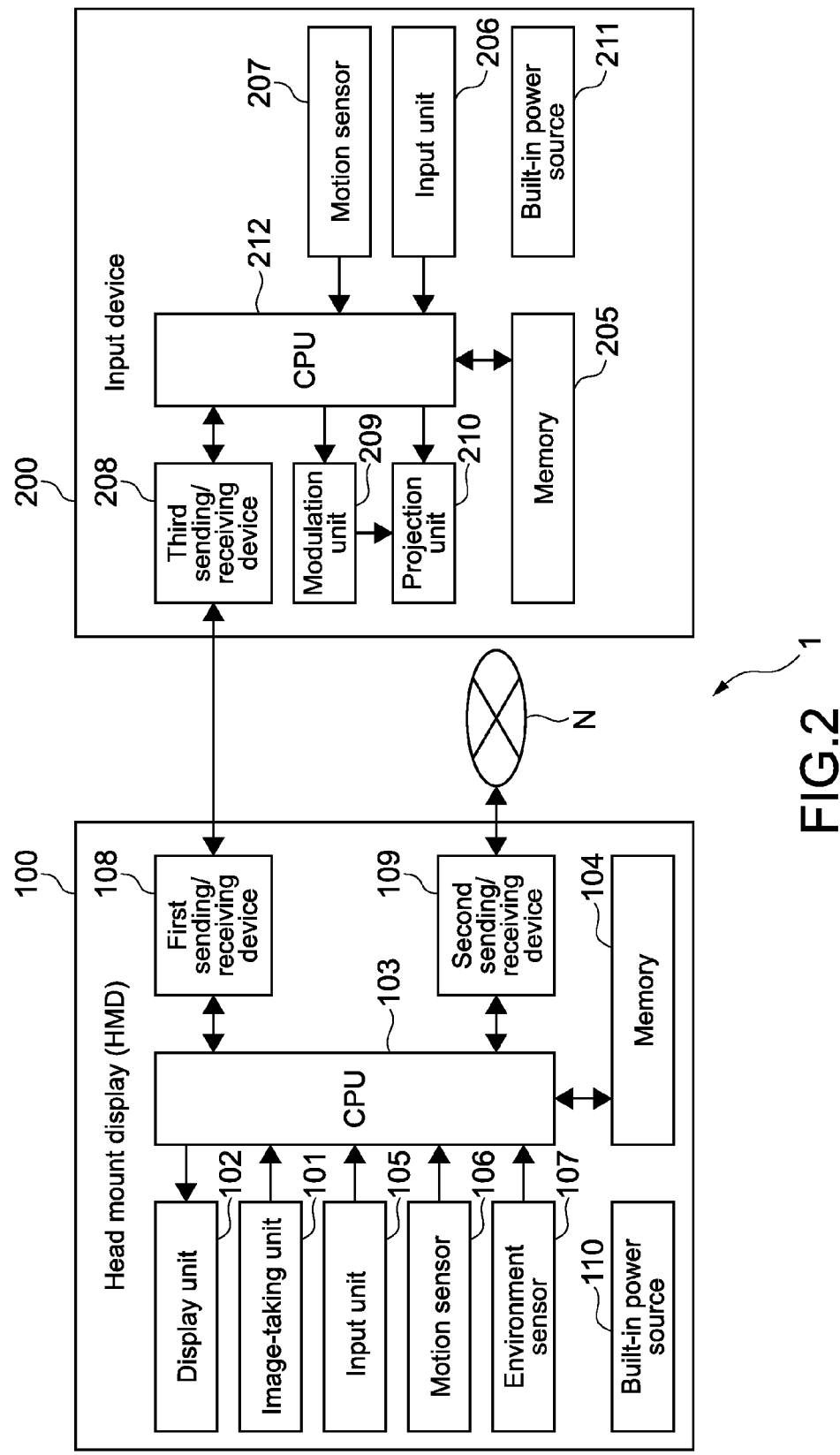
FIG. 2 is a block diagram showing the hardware configuration of an HMD and the hardware configuration of an input device.

FIG. 2 is a block diagram showing the hardware configuration of the HMD 100 and the hardware configuration of the input device 200.

The HMD 100 includes a CPU (Central Processing Unit) 103 and a built-in power source 110. The HMD 100 further includes a memory 104, the image-taking unit 101, the display unit 102, an input unit 105, a motion sensor 106, an environment sensor 107, a first sending/receiving device 108, and a second sending/receiving device 109, each of which is connected to the CPU 103.

The CPU 103 executes various processes in accordance with programs stored in the memory 104.

The image-taking unit 101 is capable of taking an image of at least a user's field of vision in real scenery. The image-taking unit 101 includes an image sensor such as a CMOS (Complementary Metal Oxide Semiconductor) image sensor, and an A/D converter configured to A/D (Analog/Digital) convert an output from the image sensor.

The display unit 102 includes an LCD (Liquid Crystal Display device), an optical system, and the like. The display unit 102 shows an image formed by the LCD to a user via the optical system. More specifically, the display unit 102 is capable of displaying an image formed by the LCD such that the image is superimposed on a user's field of vision while allowing the user to visually recognize the outwards.

The input unit 105 includes, for example, a button, a slider, a switch, a dial, a touchscreen, and the like. The input unit 105 is capable of receiving instructions to the CPU 103 and selection of content to be displayed as virtual information, which are input through user's operations.

The motion sensor 106 is, for example, an acceleration sensor, a gyro sensor, or a magnetic sensor. The motion sensor 106 is capable of detecting movement of the HMD 100.

The environment sensor 107 is capable of detecting illuminance, temperature, and humidity, for example.

The first sending/receiving device 108 is a medium/high-speed close-range wireless sending/receiving device such as, for example, Bluetooth (registered trademark) or Wi-Fi (registered trademark). The first sending/receiving device 108 sends/receives information to/from the input device 200.

The second sending/receiving device 109 is a medium-range wireless sending/receiving device such as, for example, 3G (3rd Generation) or WiMAX (Worldwide Interoperability for Microwave Access, registered trademark).

The second sending/receiving device 109 is connected to a network N such as the Internet or a LAN (Local Area Network). The second sending/receiving device 109 accesses a content server connected to the network N, and, for example, downloads content to be displayed as virtual information.

[Hardware Configuration of Input Device]

With reference to FIG. 2, the input device 200 includes a CPU 212 and a built-in power source 211. The input device 200 further includes a memory 205, an input unit 206, a motion sensor 207, a third sending/receiving device 208, a modulation unit 209, and a projection unit 210, each of which is connected to the CPU 212.

The CPU 212 executes various processes in accordance with programs stored in the memory 205. Note that an MPU (Micro Processing Unit) may be used instead of a CPU.

The input unit 206 includes buttons (such as the projection button 201, the zoom sliders 202, and the power button 203), a slider, a switch, a dial, a touchscreen, and the like. The input unit 206 is capable of receiving instructions to the CPU 212, which are input through user's operations.

The motion sensor 207 is, for example, an acceleration sensor, a gyro sensor, or a magnetic sensor. The motion sensor 207 is capable of detecting movement of the input device 200.

The third sending/receiving device 208 is a medium/high-speed close-range wireless sending/receiving device such as, for example, Bluetooth (registered trademark) or Wi-Fi (registered trademark). The third sending/receiving device 208 sends/receives information to/from the HMD 100.

The modulation unit 209 modulates digital data treated by the CPU 212 into optical signals that the projection unit 210 is capable of projecting.

The projection unit 210 is a laser pointer including a laser light source and an optical system. The optical system is capable of projecting, from the projection window 204 (FIG. 1), laser light emitted by the laser light source on a projection target object (wall, desk, etc.) in real scenery as a graphic having a predetermined shape being a marker. As the laser pointer, a point-display-type laser pointer (red, green, blue), a beam-variable-type (scanner-type, lens-type, hologram-type) laser pointer, an ultraviolet-type laser pointer, an infrared-type laser pointer, or the like may be employed.

[Processes Executed by HMD]

The HMD 100 and the input device 200 are capable of executing the following three processes.

1. The input device 200 adds information (second information) specifying the input device 200 itself to a marker. The HMD 100 specifies the input device 200, which projects a marker in real image data, based on an image of the marker taken by the HMD 100. In a case where the marker is projected by the particular input device 200, the HMD 100 displays virtual information (first process).

2. The input device 200 adds, to a marker, configuration changing information (second information) of virtual information displayed such that the virtual information is superimposed on the real scenery. The HMD 100 specifies the configuration changing information of virtual information based on an image of the marker taken by the HMD 100. The HMD 100 changes the configuration of virtual information based on the specified changing information (second process). Specifically, the configuration of virtual information is display position, size, and the like of displayed virtual information.

3. The input device 200 adds, to a marker, location information (second information). The location information (second information) specifies a location on a network in which object data is stored. The HMD 100 specifies a location on a network of object data based on an image of the marker taken by the HMD 100, downloads virtual information from the network, and displays the virtual information (third process).

<First Process>

[Gist of First Process]

To solve the above-mentioned problems of the marker-type AR technology and the markerless-type AR technology, there is disclosed a method of projecting a marker from a handheld laser pointer held by a user (Japanese Patent Application Laid-open No. 2007-272623). Here, let's assume that a plurality of users display virtual information on the same projection target object (desk, wall, etc.), and that the plurality of users control the virtual information simultaneously by using input devices (laser pointers), respectively. In this case, the following processes and the like are executed. Each of the users projects a pointing point on the projection target object by using the input device. The user moves the input device to thereby move the pointing point projected on the projection target object. The virtual information displayed on the pointing point moves as the pointing point moves. In this case, let's assume that a plurality of users use input devices, which project pointing points having the same shape. In this case, an image-taking device is not capable of determining which pointing point is projected by an input device of which user. As a result, for example, based on a pointing point projected by an input device of an irrelevant user, virtual information may be displayed to another user.

Meanwhile, according to Japanese Patent Application Laid-open No. H07-200160, a plurality of users control virtual information by using laser pointers as input devices, respectively. In this situation, the input devices change project patterns of the pointing points, respectively. As a result, it is possible to distinguish between the input devices of the plurality of users. However, according to the method, it is necessary to physically change the shapes of the project patterns of the input devices. This method has limitations from the viewpoint of technology and cost, which is problematic. Specifically, this is a large problem in a case where the number of input devices used at the same time is large, in a case of a configuration capable of changing the project pattern during input operation, and the like.

Here, let's discuss a case where a laser projector is used as an input device instead of a laser pointer. A laser projector includes, for example, a built-in MEMS (Micro Electro Mechanical System) scanner. The laser projector scans from top to bottom by means of one laser light, which moves from side to side at high speed. The laser projector is capable of projecting a graphic having an arbitrary shape and an arbitrary image. Meanwhile, a laser projector requires hardware/software configurations more complex than those of a laser pointer, which projects a simple graphic, which is problematic. As a result, a laser projector itself may be large, costs may rise, and power consumption may be increased, which are problematic. Further, even in a case where the shapes of graphics projected by a plurality of input devices are different from each other, if projected graphics are overlapped each other, it is difficult to discriminate the projected graphics, which is problematic.

In view of the above-mentioned circumstances, in the first process, the HMD determines which input device projects a marker, whose image is taken by the HMD, stably and with a high degree of accuracy. As a result, the HMD determines a marker, on which virtual information is to be displayed, stably and with a high degree of accuracy. As a result, it is possible to display virtual information stably and with a high degree of accuracy.

[Input Device]

The input device 200 is configured to project a marker, to which information (identification information) uniquely identifying the input device itself is added. The identification information may be, for example, a serial number or the like set when manufacturing the input device 200, or a user name or the like set by a user by using the input unit 206. More specifically, the input device 200 is configured to project a marker having at least one of unique light intensity (amplitude), unique wavelength (frequency), and unique blinking periods. It is possible to uniquely identify the input device 200 based on individual differences of light intensity (amplitude), wavelength (frequency), and blinking periods.

[Functional Configuration of HMD for Executing First Process]

Figure 3:
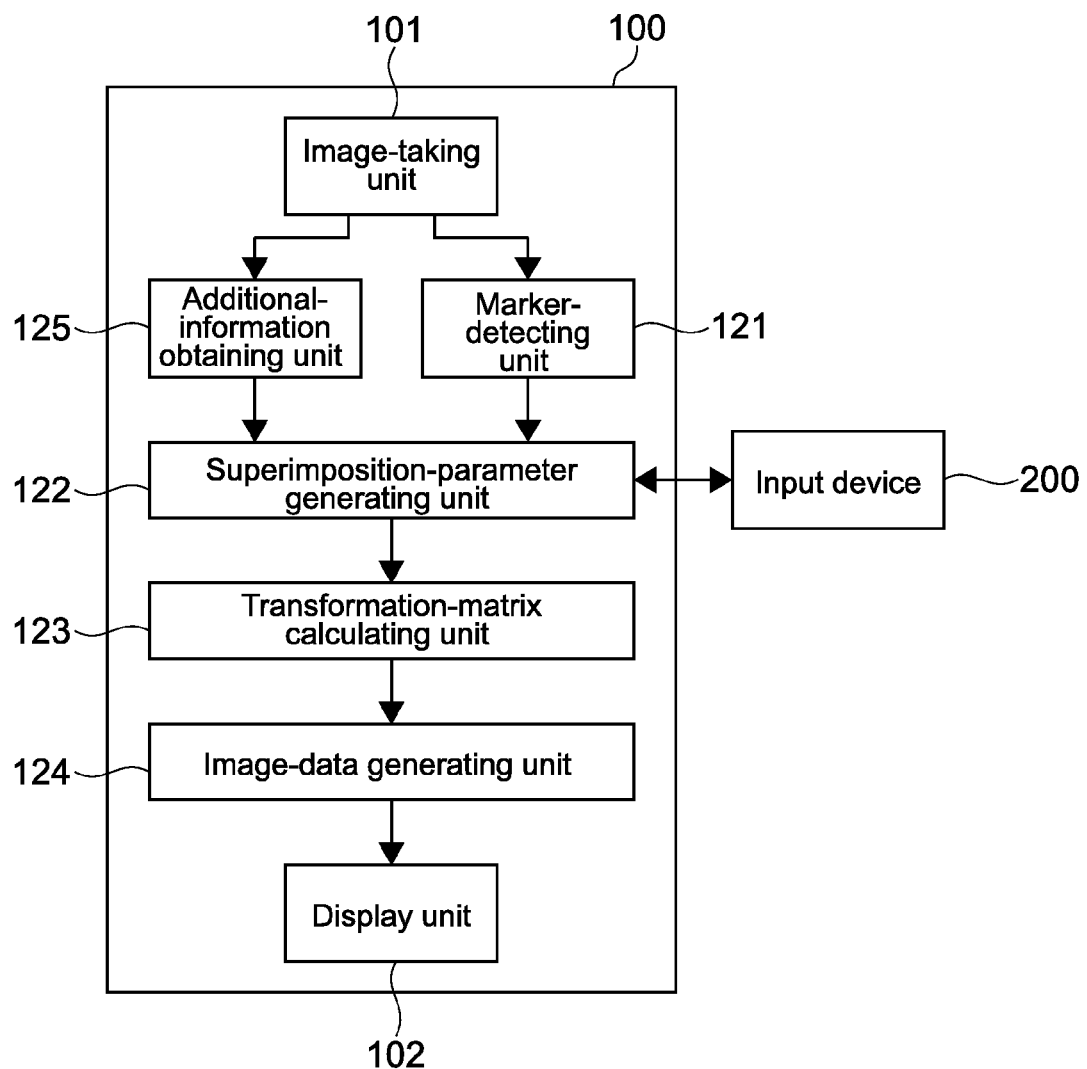
FIG. 3 is a block diagram showing the functional configuration of the HMD for executing first process.

FIG. 3 is a block diagram showing the functional configuration of the HMD 100 for executing the first process.

The HMD 100 includes the image-taking unit 101, a marker-detecting unit 121, an additional-information obtaining unit 125 (extracting unit), a superimposition-parameter generating unit 122, a transformation-matrix calculating unit 123, an image-data generating unit 124, and the display unit 102.

The image-taking unit 101 takes an image of real scenery, and obtains real image data. The image-taking unit 101 supplies the obtained real image data to the marker-detecting unit 121 and the additional-information obtaining unit 125.

The additional-information obtaining unit 125 obtains the real image data from the image-taking unit 101. The additional-information obtaining unit 125 processes the image to thereby measure characteristics of the marker. Specifically, the characteristics of the marker include at least one of light intensity (amplitude), wavelength (frequency), and blinking periods. The additional-information obtaining unit 125 determines identification information of the input device 200, which is assigned to the measured characteristics. The additional-information obtaining unit 125 determines if the input device 200, which is represented by the determined identification information, is a projection target of virtual information. Here, the additional-information obtaining unit 125 previously registers that which input device 200 projects a marker on which virtual information is displayed. In other words, at least one input device 200 as a projection target of virtual information is previously registered in the additional-information obtaining unit 125. For example, a user sets a projection target of virtual information by using the input unit 105. The additional-information obtaining unit 125 notifies the superimposition-parameter generating unit 122 of the determination result.

The marker-detecting unit 121 detects a marker projected by the input device 200 from the real image data obtained by the image-taking unit 101. Information on a reference marker is previously registered in the marker-detecting unit 121. The "reference marker" is a marker having a predetermined reference shape in a case where the marker is projected at a predetermined distance in a perpendicular direction. The "information on a reference marker" includes the size of the reference marker, distances between respective corners, lengths of respective sides, and the like. The marker-detecting unit 121 generates a plane-coordinate transformation matrix based on the size of the reference marker. According to the plane-coordinate transformation matrix, a marker detected from real image data coincides with the shape of a reference marker. The marker-detecting unit 121 executes coordinate transformation with respect to the detected marker by using the plane-coordinate transformation matrix. Subsequently, the marker-detecting unit 121 executes pattern matching between the coordinate-transformed marker and the reference marker. The marker-detecting unit 121 determines a degree of coincidence between the detected marker and the reference marker. The marker-detecting unit 121 supplies the determination result to the superimposition-parameter generating unit 122.

Figure 4:
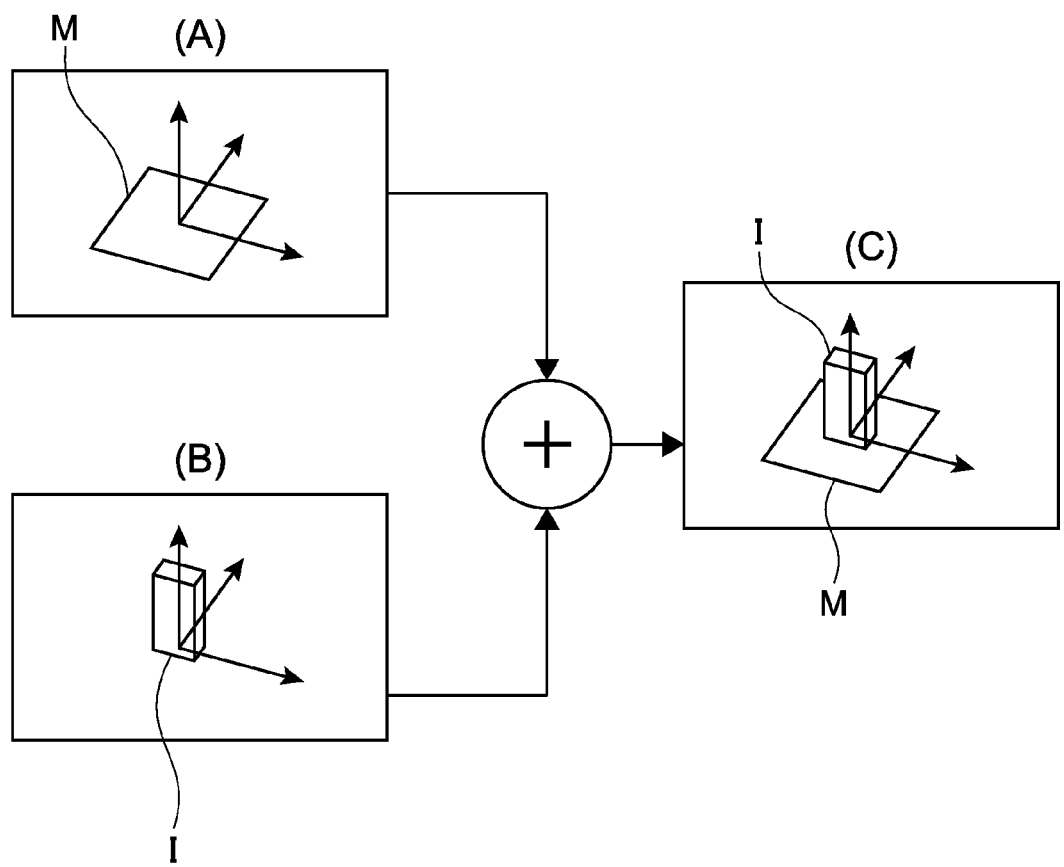
FIG. 4 is a diagram schematically showing the principle of generating a superimposition parameter by a superimposition-parameter generating unit.

The superimposition-parameter generating unit 122 calculates spatial positional relation (i.e., angle and distance) between a marker and the image-taking unit 101 based on distortion of the marker with respect to the reference marker. Here, the marker is projected by the input device 200, which is a projection target of virtual information. The marker has a predetermined degree of coincidence. The marker is projected on a projection target object (wall, desk, etc.). Further, as shown in FIG. 4, the superimposition-parameter generating unit 122 calculates a coordinate system (A) of the marker M based on an outline extraction method. The superimposition-parameter generating unit 122 calculates a superimposition parameter of virtual information such that a coordinate system (C) is attained, based on the spatial positional relation between the marker and the image-taking unit 101. In the coordinate system (C), the coordinate system (A) of the marker M coincides with a previously-set coordinate system (B) of the virtual information I. The superimposition-parameter generating unit 122 corrects the superimposition parameter such that virtual information is displayed more naturally to a user, based on the position of the HMD 100 detected by the motion sensor 106 and based on the position of the input device 200 detected by the motion sensor 106 of the input device 200. Further, the superimposition-parameter generating unit 122 corrects the superimposition parameter based on positional relation between the eyes of the user and the display unit 102.

The transformation-matrix calculating unit 123 generates a space-coordinate transformation matrix. The space-coordinate transformation matrix is used to convert a coordinate system in which a marker is a reference into a coordinate system in which the image-taking unit 101 in real scenery is a reference, based on the superimposition parameter. The image-data generating unit 124 executes coordinate transformation of object data of previously-recorded virtual information by using the space-coordinate transformation matrix supplied from the transformation-matrix calculating unit 123. As a result, the image-data generating unit 124 calculates (draws) object image data of virtual information in a coordinate system in which the image-taking unit 101 is a reference.

The image-data generating unit 124 supplies the generated object image data of virtual information into the display unit 102.

The display unit 102 displays the object image data of the virtual information supplied from the image-data generating unit 124.

[Behaviors of First Process Executed by HMD]

Figure 5:
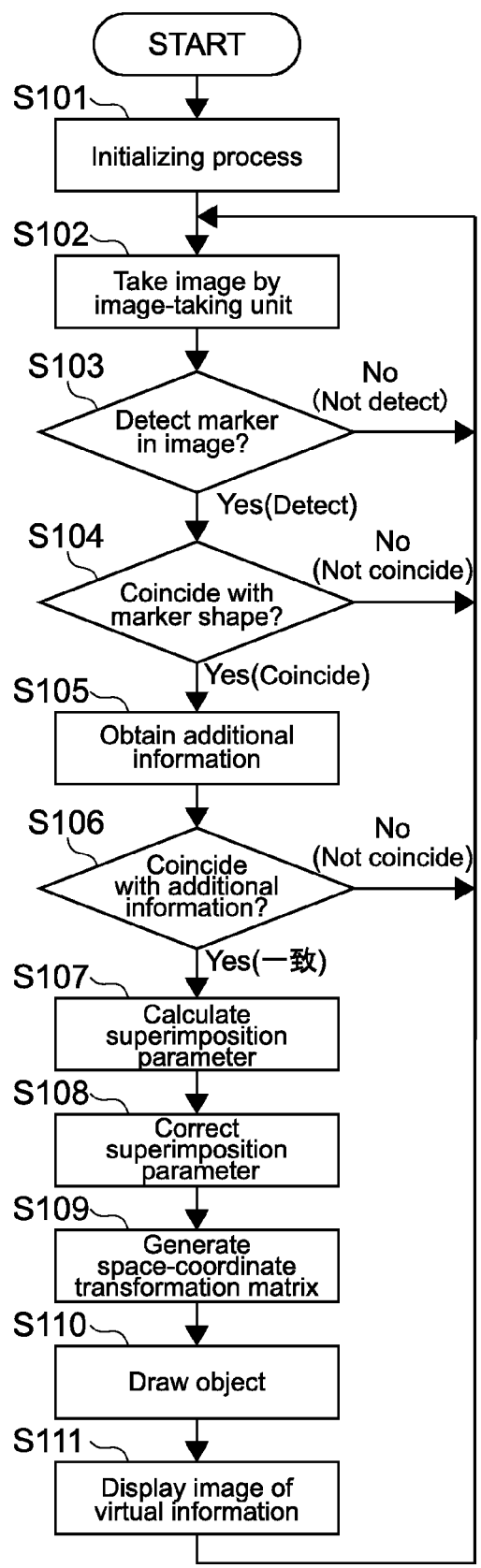
FIG. 5 is a flowchart showing behaviors of the first process executed by the HMD.

FIG. 5 is a flowchart showing behaviors of the first process executed by the HMD 100.

The CPU 103 executes a predetermined initializing process (Step S101). Then, the image-taking unit 101 takes an image of real scenery, and obtains real image data (Step S102). The image-taking unit 101 supplies the obtained real image data to the marker-detecting unit 121 and the additional-information obtaining unit 125.

The marker-detecting unit 121 detects a marker projected by the input device 200 from the real image data obtained (Step S102) by the image-taking unit 101 (Step S103). The marker-detecting unit 121 generates a plane-coordinate transformation matrix based on the size of the reference marker. According to the plane-coordinate transformation matrix, a marker detected from real image data coincides with the shape of a reference marker. The marker-detecting unit 121 executes coordinate transformation with respect to the detected marker by using the plane-coordinate transformation matrix. Subsequently, the marker-detecting unit 121 executes pattern matching between the coordinate-transformed marker and the reference marker. The marker-detecting unit 121 determines a degree of coincidence between the detected marker and the reference marker (Step S104). The marker-detecting unit 121 supplies the determination result to the superimposition-parameter generating unit 122.

Meanwhile, the additional-information obtaining unit 125 also obtains the real image data from the image-taking unit 101. The additional-information obtaining unit 125 processes the image to thereby measure characteristics of a marker, i.e., at least one of light intensity (amplitude), wavelength (frequency), and blinking periods. The additional-information obtaining unit 125 determines identification information of the input device 200 (Step S105). The identification information is assigned to the measured characteristics. The additional-information obtaining unit 125 determines if the input device 200, which is indicated by the determined identification information, coincides with a projection target of virtual information (Step S 106). The additional-information obtaining unit 125 notifies the superimposition-parameter generating unit 122 of the determination result.

The superimposition-parameter generating unit 122 estimates spatial positional relation between a marker and the image-taking unit 101 based on distortion of the marker with respect to the reference marker. Here, the marker is projected by the input device 200, which is a projection target of virtual information (Step S106, Yes), and has a predetermined degree of coincidence (Step S104, Yes). Specifically, the superimposition-parameter generating unit 122 calculates spatial positional relation between the image-taking unit 101 and a marker projected on a projection target object (wall, etc.), i.e., angle and distance. Further, the superimposition-parameter generating unit 122 calculates a superimposition parameter of the virtual information such that the coordinate system of the marker coincides with the coordinate system of the virtual information (Step S107). Then, the superimposition-parameter generating unit 122 corrects the superimposition parameter such that the virtual information is displayed more naturally to a user (Step S108).

The transformation-matrix calculating unit 123 generates a space-coordinate transformation matrix (Step S 109). The space-coordinate transformation matrix is used to convert a coordinate system in which a marker is a reference into a coordinate system in which the image-taking unit 101 in real scenery is a reference, based on the superimposition parameter. The image-data generating unit 124 executes coordinate transformation of object data of previously-recorded virtual information by using the space-coordinate transformation matrix supplied from the transformation-matrix calculating unit 123. As a result, the image-data generating unit 124 calculates (draws) object image data of virtual information in a coordinate system in which the image-taking unit 101 is a reference (Step S110). The image-data generating unit 124 supplies the generated object image data of virtual information into the display unit 102. The display unit 102 displays the supplied object image data of the virtual information (Step S111). After that, processes from obtainment of image data of real scenery (Step S102) to display of object image data of virtual information (Step S111) are repeated with respect to the subsequent frames.

[Effects of First Process]

As described above, according to the first process, the following effects may be obtained.

Figure 6:
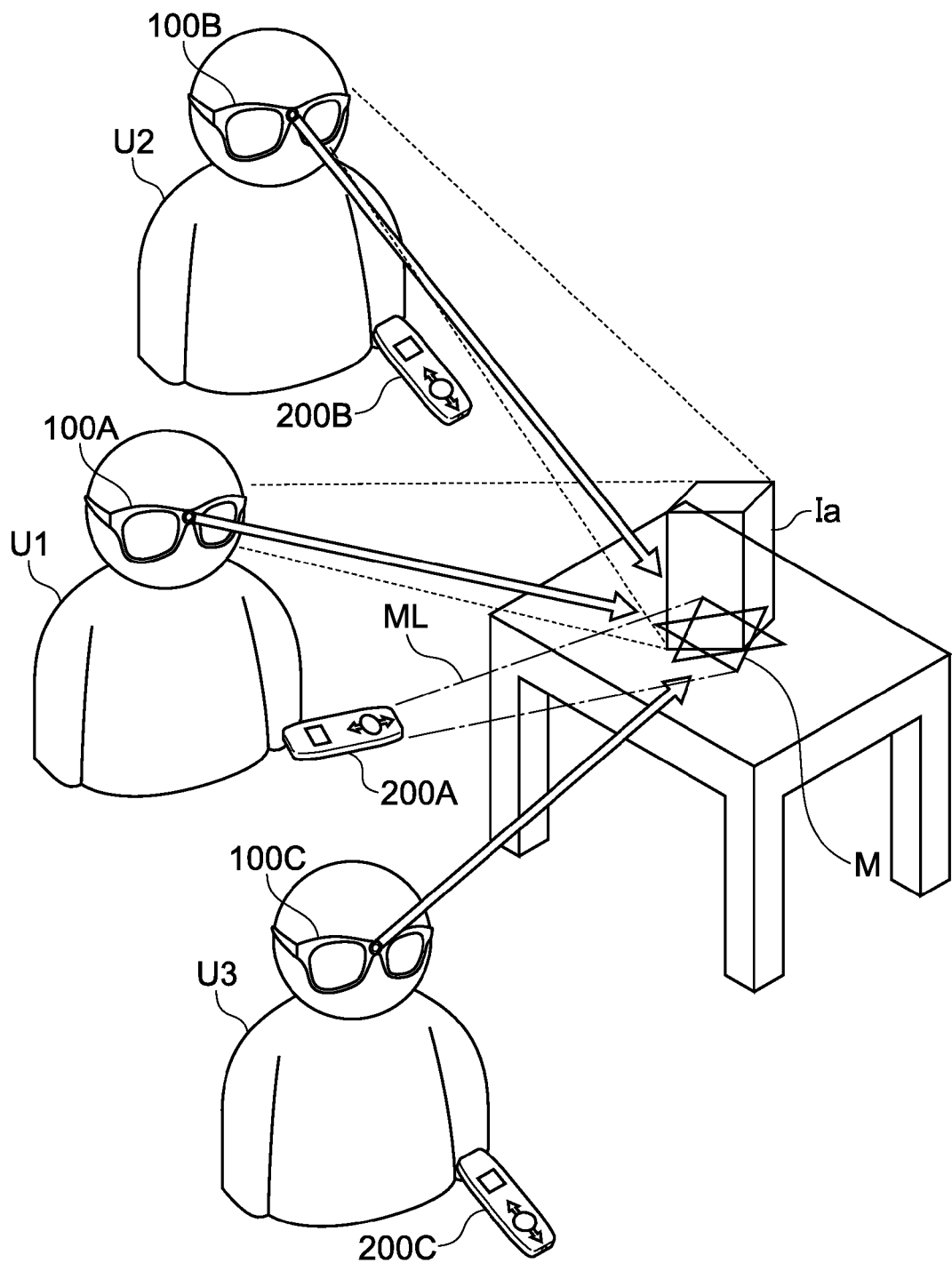
FIG. 6 is a diagram schematically showing the first process.

1. If an HMD is not capable of identifying which input device emits which marker, the HMD may display virtual information with respect to a marker projected by an input device of an irrelevant user, for example To the contrary, according to the first process, as shown in FIG. 6, HMDs 100A, 100B are capable of identifying identification information of an input device 200A, which is added to a marker ML. Each of the HMDs 100A, 100B is capable of displaying virtual information Ia on a marker M. However, a HMD 100C is not capable of identifying identification information of the input device 200A, which is added to the marker ML. The HMD 100C is not capable of displaying virtual information on the marker M, even if obtained real image data includes the marker M. In this manner, it is possible to allow the HMD 100A and the HMD 100B to display virtual information. It is possible not to allow the HMD 100C to display virtual information. The HMD 100A is owned by a user U1 who holds an input device 200A, which projects the marker M. The HMD 100B is owned by a user U2 who relates to the user U1. The HMD 100C is owned by an irrelevant user U3.

2. According to a technology in which the shapes of markers are different from each other and each input device is distinguished, in a case where projected markers are overlapped with each other on a projection target object, it is difficult to identify each marker. As a result, it is difficult to identify each input device, which projects each marker, which is problematic.

To the contrary, according to the first process, identification information identifying an input device is added to a marker. So it is possible to determine an input device, which projects a marker, stably and with a high degree of accuracy based on at least one of light intensity (amplitude), wavelength (frequency), and blinking periods of the marker irrespective of overlapped markers. Further, the first process has the following merits. That is, this embodiment is lower in cost than the technology in which the shapes of markers emitted from input devices are different from each other physically. This embodiment can be realized by employing hardware/software configurations simpler than those of a technology, which uses laser pointers capable of projecting markers having various shapes.

<Second Process>

Hereinafter, configurations and the like different from those already described will be mainly described. Repetition in descriptions will be avoided.

In the first process, identification information identifying the input device 200 is added as additional information added to a marker. To the contrary, in the second process, configuration changing information is added as additional information added to a marker. The configuration changing information is of virtual information to be displayed such that the virtual information is superimposed on real scenery.

[Input Device]

A user inputs a predetermined operation in the input unit 206 of the input device 200 (e.g., presses button). Then, the CPU 212 determines that configuration changing information of marker display (e.g., to move, rotate, enlarge/reduce (zoom) marker, etc.) is input. Here, characteristics (at least one of light intensity (amplitude), wavelength (frequency), and blinking periods) of a marker are uniquely assigned to the configuration changing information of marker display (e.g., to move, rotate, enlarge/reduce (zoom) marker, etc.). For example, increase of frequency is assigned to enlarging a marker, and decrease of frequency is assigned to reducing a marker. The CPU 212 determines that configuration changing information of marker display is input in the input unit 206. Then, the CPU 212 changes a projected marker based on characteristics (at least one of light intensity (amplitude), wavelength (frequency), and blinking periods) assigned to the configuration changing information of marker display.

[HMD]

The additional-information obtaining unit 125 of the HMD 100 processes an image to thereby measure characteristics (at least one of light intensity (amplitude), wavelength (frequency), and blinking periods) of a marker in real image data obtained from the image-taking unit 101. The additional-information obtaining unit 125 detects that the characteristics are changed. Then, the additional-information obtaining unit 125 determines configuration changing information of marker display assigned to the changed characteristics. Here, how to change virtual information displayed on a marker according to the way of changing characteristics (at least one of light intensity (amplitude), wavelength (frequency), and blinking periods) of the marker is previously registered in the additional-information obtaining unit 125. For example, enlarging a marker is registered for increase of frequency, and reducing a marker is registered for decrease of frequency. The additional-information obtaining unit 125 notifies the superimposition-parameter generating unit 122 of the determination result.

Note that instructions (enter, return, etc.) to an application may be added as additional information to a marker emitted from the input device 200, in addition to configuration changing information of virtual information. The HMD 100 may execute an application based on an instruction to the application added to a marker.

[Effect of Second Process]

As described above, according to the second process, the following effect may be obtained.

Even if a user does not hold the input device 200 with his hand and does not move the input device 200, it is possible to input configuration changing information (e.g., to move or rotate virtual information, etc.) of virtual information only by inputting a predetermined operation in the input device 200. Because of this, it is possible to input configuration changing information of virtual information in a state where the input device 200 is on a table or the like, for example. The user-friendliness is thus improved.

<Third Process>

Figure 7:
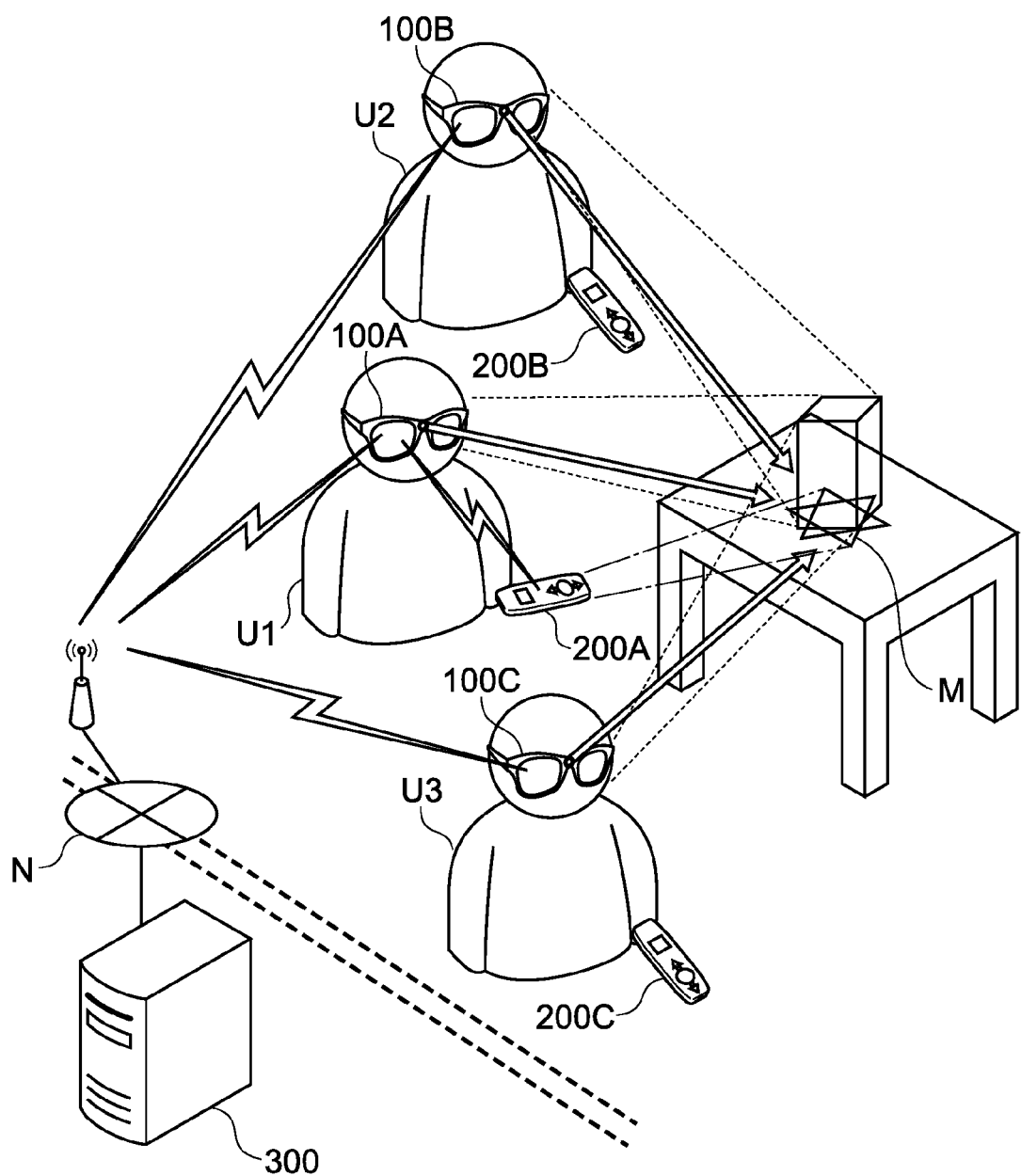
FIG. 7 is a diagram schematically showing the third process.

FIG. 7 is a diagram schematically showing the third process.

A user U1 has an input device 200A, which projects the marker M, and wears an HMD (hereinafter, referred to as "projection HMD") 100A. The projection HMD 100A supplies location information to the input device 200A. The location information specifies a location on a network, in which object data to be displayed as virtual information is stored. The input device 200A adds the obtained location information to a marker. Users U2, U3 do not have the input device 200A, which projects the marker M, and wear HMDs (hereinafter, referred to as "non-projection HMDs") 100B, 100C. Each of the non-projection HMDs 100B, 100C extracts location information from a marker in a taken image. Each of the non-projection HMDs 100B, 100C is capable of downloading object data to be displayed as virtual information from a content server 300 connected to the network N based on the location information.

[Functional Configuration of HMD for Executing Third Process]

Figure 8:
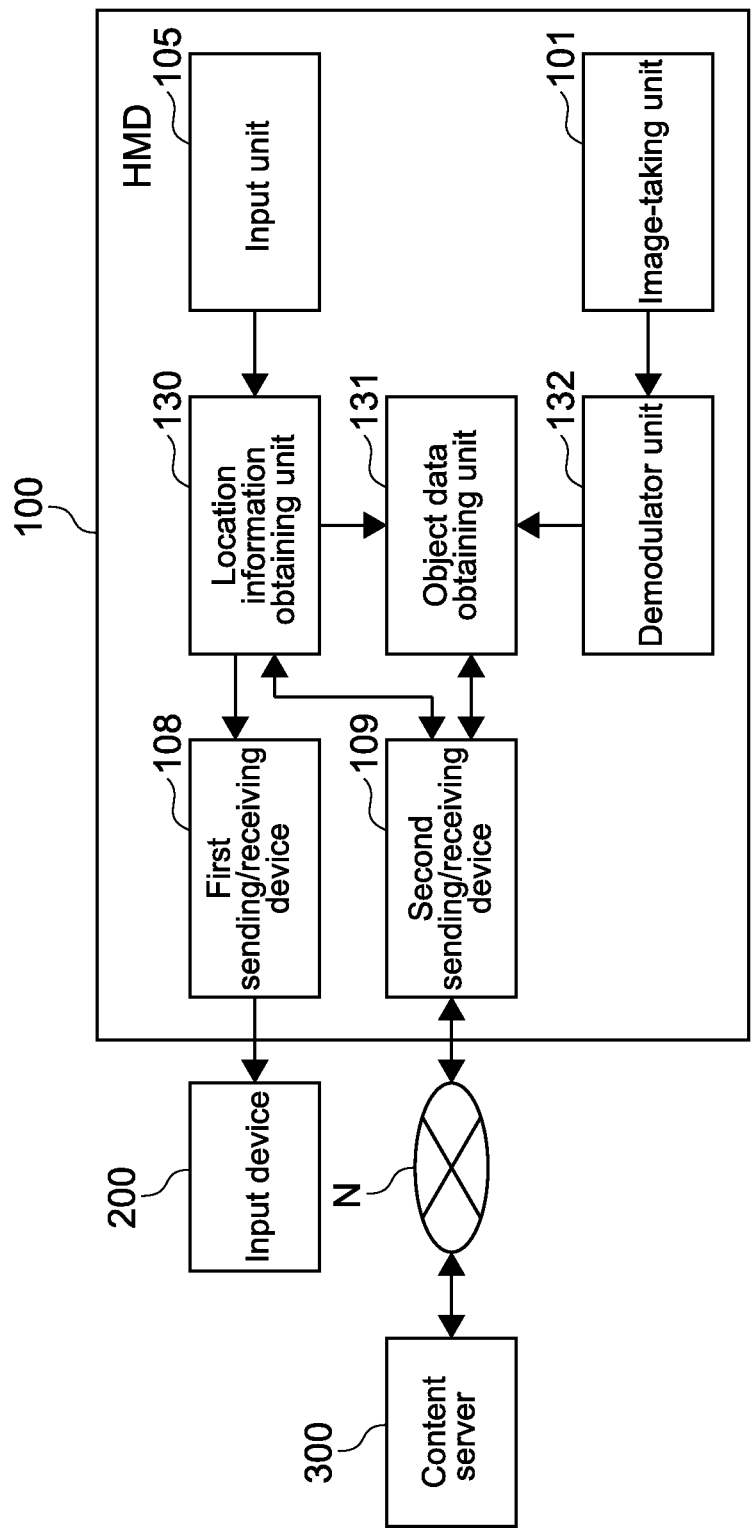
FIG. 8 is a block diagram showing the functional configuration of the HMD for executing the third process.

FIG. 8 is a block diagram showing the functional configuration of the HMD 100 for executing the third process.

The HMD 100 includes a location information obtaining unit 130, the first sending/receiving device 108, the image-taking unit 101, a demodulator unit 132, an object data obtaining unit 131, and the second sending/receiving device 109.

The location information obtaining unit 130 and the first sending/receiving device 108 execute (1) functions specific to the projection HMD. The image-taking unit 101 and the demodulator unit 132 execute (2) functions specific to the non-projection HMD 100. The object data obtaining unit 131 and the second sending/receiving device 109 execute (3) functions common to the projection HMD 100 and the non-projection HMD 100.

[(1) Functions Specific to Projection HMD]

The location information obtaining unit 130 obtains location information. The location information specifies a location in the network N, in which object data to be displayed as virtual information is stored. The "location information" is, specifically, URL (Uniform Resource Locator), local network path, or the like. For example, the location information obtaining unit 130 may obtain location information via the network N by using the second sending/receiving device 109. Alternatively, the location information obtaining unit 130 may obtain location information input by a user by using the input unit 105. The location information obtaining unit 130 supplies the obtained location information to the object data obtaining unit 131. Further, the location information obtaining unit 130 encodes the obtained location information to thereby generate encoded information. The location information obtaining unit 130 sends the generated encoded information to the input device 200 by using the first sending/receiving device 108.

[(2) Functions Specific to Non-Projection HMD 100]

The image-taking unit 101 takes an image of real scenery to thereby obtain real image data. The image-taking unit 101 supplies the obtained real image data to the demodulator unit 132.

The demodulator unit 132 processes an image to thereby measure change of light intensity (amplitude) or wavelength (frequency) of a marker in real image data. The demodulator unit 132 extracts encoded information based on the measurement result. The demodulator unit 132 decodes the extracted encoded information to thereby obtain location information as additional information. That is, the demodulator unit 132 functions as an additional-information obtaining unit. The demodulator unit 132 supplies location information to the object data obtaining unit 131.

[(3) Functions Common to Projection HMD 100/Non-Projection HMD 100]

The object data obtaining unit 131 downloads object data from the content server 300 via the network N based on location information obtained from the location information obtaining unit 130 or from the demodulator unit 132 by using the second sending/receiving device 109.

[Hardware Configuration of Input Device for Executing Third Process]

Figure 9:
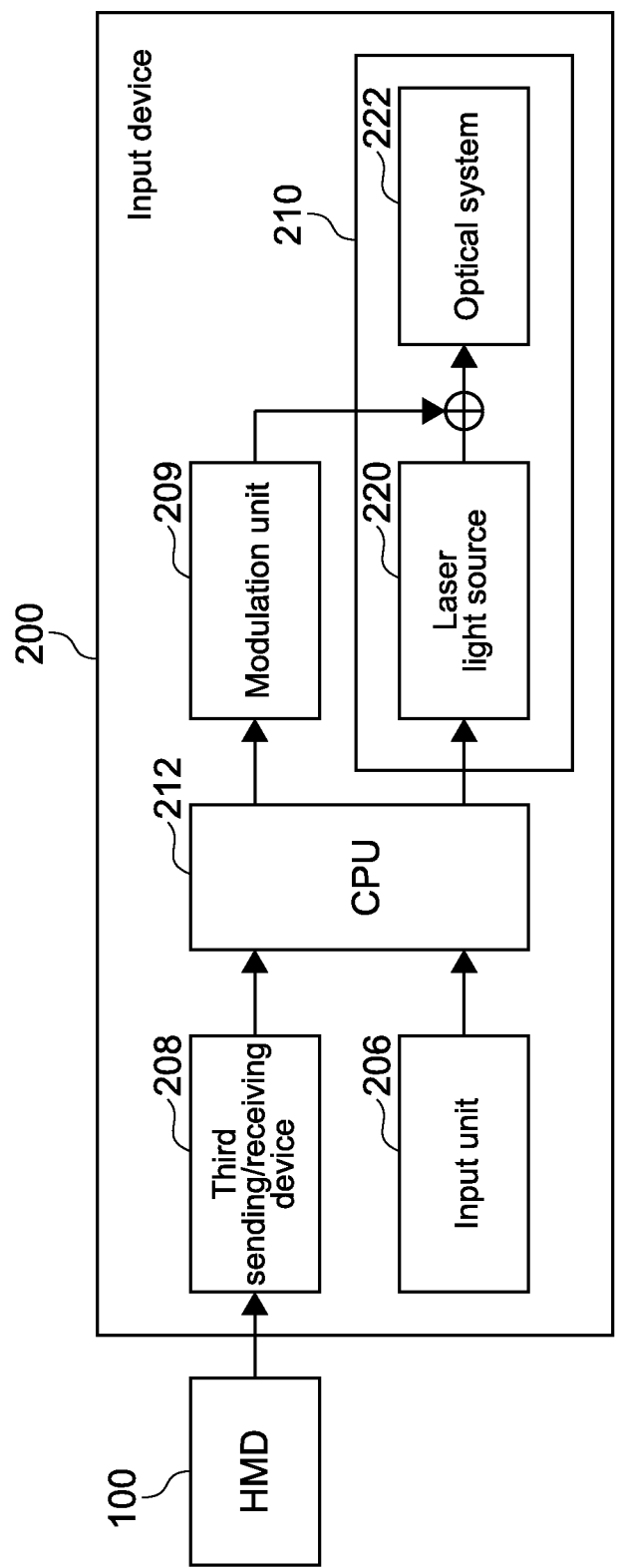
FIG. 9 is a block diagram showing the hardware configuration of the input device for executing the third process.

FIG. 9 is a block diagram showing the hardware configuration of the input device 200 for executing the third process.

The input device 200 includes the CPU 212, the input unit 206, the third sending/receiving device 208, the modulation unit 209, a laser light source 220, and an optical system 222.

The laser light source 220 and the optical system 222 are included in the projection unit 210.

The CPU 212 detects an operation input in the input unit 206 by a user, and turns on/off the laser light source 220. Further, the CPU 212 obtains encoded information from the HMD 100 by using the third sending/receiving device 208. The encoded information is information obtained by encoding location information. The CPU 212 generates modulation information. The modulation information is information used to modulate (amplitude modulate or frequency modulate) the encoded information into a marker. The CPU 212 supplies the generated modulation information to the modulation unit 209.

The modulation unit 209 modulates (amplitude modulates or frequency modulates) a marker emitted from the laser light source 220 based on the modulation information obtained from the CPU 212. As a result, encoded information is added. The encoded information is information obtained by encoding location information into a marker.

The optical system projects the marker obtained by modulation on real scenery by using the projection window 204.

Note that, according to this embodiment, the HMD 100 encodes location information to thereby generate encoded information, and sends the encoded information to the input device 200. Alternatively, the HMD 100 may send location information to the input device 200, and the input device 200 may encode the location information to thereby generate encoded information.

Further, according to this embodiment, encoded information of location information is additional information. The location information specifies a location in a network, in which object data to be displayed as virtual information is stored. Alternatively, encoded information of identification information of the input device 200 described in the first process or encoded information of configuration changing information of virtual information described in the second process may be additional information.

[Effect of Third Process]

As described above, according to the third process, the following effect may be obtained.

Let's assume that an HMD (referred to as "data holding HMD") of a user having an input device, which projects a marker, holds object data of virtual information to be displayed on the marker, and that each of a plurality of HMDs (referred to as "no-data holding HMDs") displays the object. In this case, in a case where each of a plurality of no-data holding HMDs obtains object data, for example, the following method or the like may be employed. That is, each of a plurality of no-data holding HMDs obtains data from the data holding HMD via wireless communication or the like. However, according to this method, if communication is not established (e.g., no-data holding HMD is not capable of accessing data holding HMD), the no-data holding HMD is not capable of displaying virtual information.

To the contrary, according to the third process, it is not necessary for HMDs to directly communicate with each other and to share object data. It is possible for each of an unspecified number of HMDs to extract location information from real image data, to obtain object data from a network based on the location information, and to display the same object. It is possible to apply such a technology to, for example, the purpose of showing signage to an unspecified number of users in a public area, and other purposes.

MODIFIED EXAMPLE 1

The modified example described below is a case where amplitude (intensity) of light projected by the input device 200 in the above embodiment is changed to thereby add information. The HMD 100 may further include a filter (blinking period synchronous PLL (Phase-Locked Loop), differential filter, or the like) capable of detecting light intensity change pattern of a marker projected by the input device 200. In this case, the marker-detecting unit 121 detects a marker in the filtered real image data.

The modified example described below is a case where frequency (wavelength) of light projected by the input device 200 in the above embodiment is changed to thereby add information. The HMD 100 may further include a filter (wavelength selection filter, differential filter, or the like) capable of detecting wavelength change pattern of a marker projected by the input device 200. In this case, the marker-detecting unit 121 detects a marker in the filtered real image data.

In a case where a filter is not used, recognition rate (S/N (Signal/Noise)) of a marker in real image data recognized by the HMD 100 is decreased affected by ambient light such as intense sun light (afternoon sunlight, metallic reflection light) or intense electric light. As a result, recognition errors or calculation errors may occur. However, it is possible to execute display and input operations of virtual information stably and with a high degree of accuracy under ambient light by using a filter.

MODIFIED EXAMPLE 2

Figure 10:
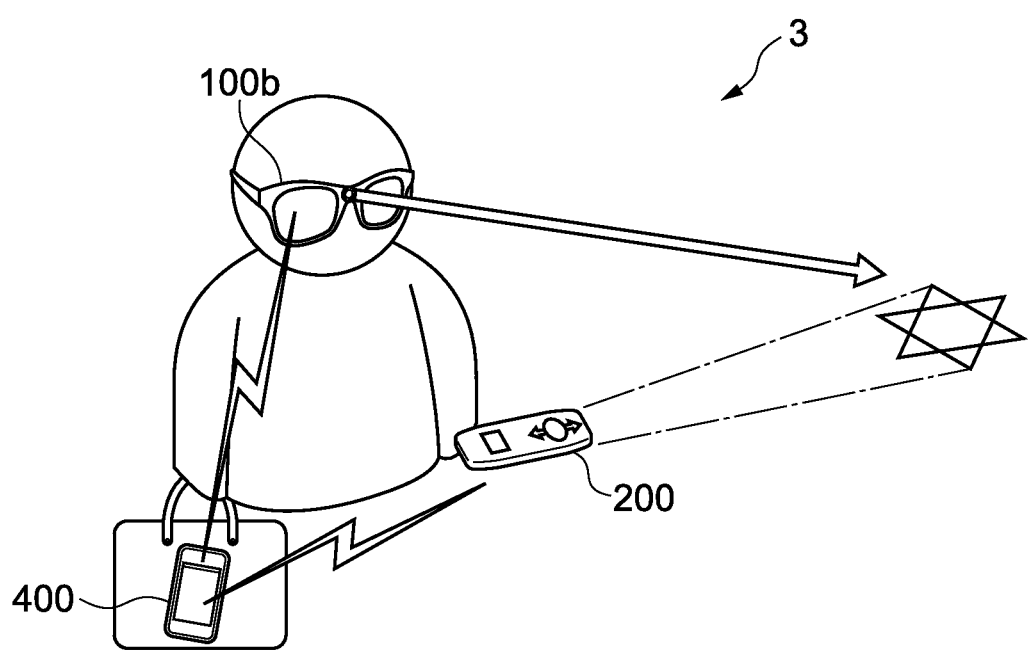
FIG. 10 is a schematic diagram showing an information processing system according to a modified example 2.
Figure 11:
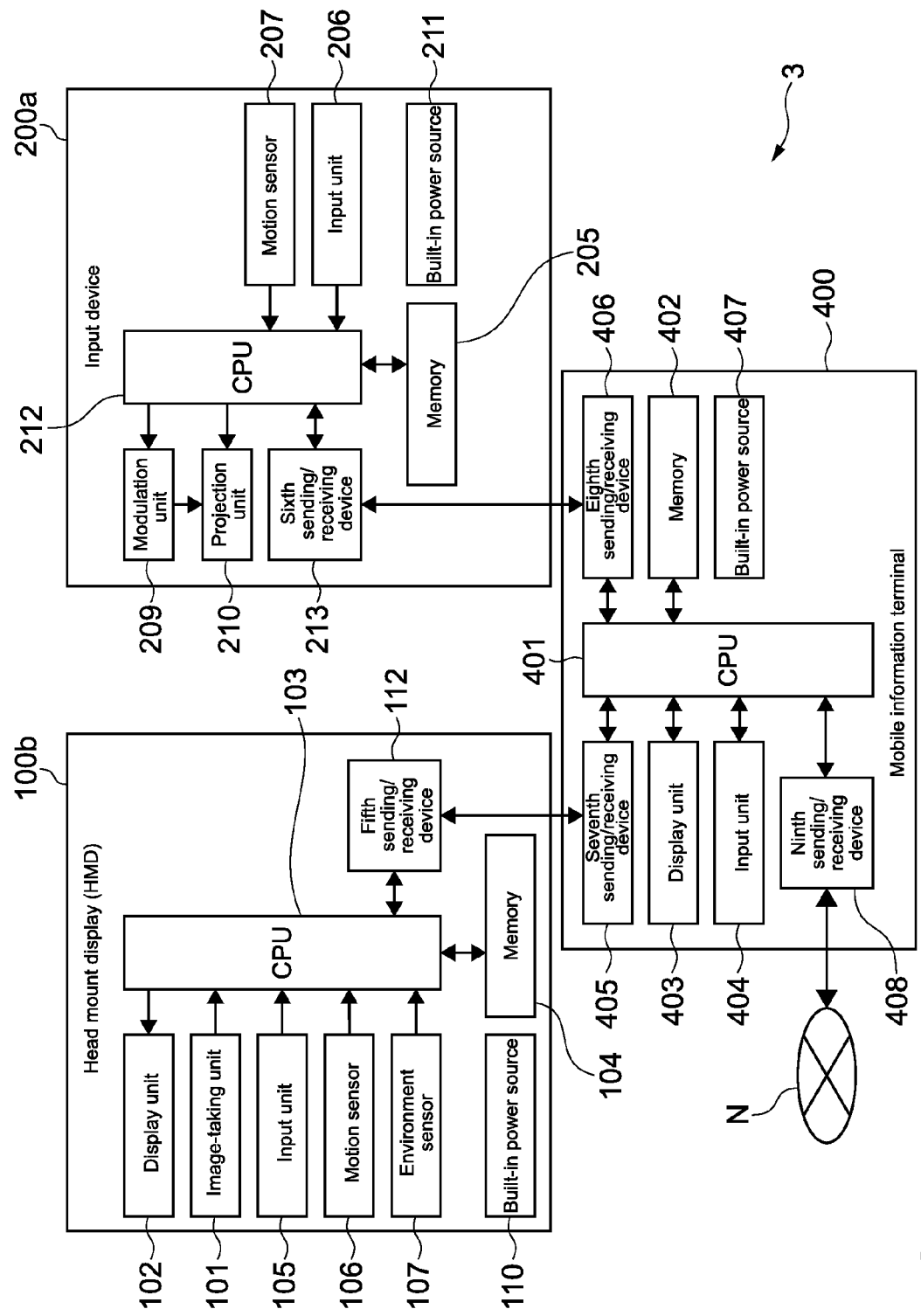
FIG. 11 is a block diagram showing the hardware configuration of an information processing system according to the modified example 2.

FIG. 10 is a schematic diagram showing an information processing system 3 according to the modified example 2. FIG. 11 is a block diagram showing the hardware configuration of the information processing system 3 according to the modified example 2.

The information processing system 3 includes an HMD 100b, an input device 200a, and a mobile information terminal 400. In the above embodiment, the CPU 103 in the HMD 100, 100a executes main process. To the contrary, according to the information processing system of this modified example, the mobile information terminal 400, which is independent of the HMD 100b, executes main process. As the mobile information terminal 400, for example, a smartphone or a handheld game machine may be employed.

The hardware configuration of the HMD 100b is similar to the hardware configuration of the HMD 100 of the first embodiment except that the HMD 100b does not include the first sending/receiving device 108 and the second sending/receiving device 109 and further includes a fifth sending/receiving device 112. The fifth sending/receiving device 112 is a medium/low-speed close-range wireless sending/receiving device such as, for example, Bluetooth (registered trademark). The fifth sending/receiving device 112 sends/receives information to/from the mobile information terminal 400. More specifically, the fifth sending/receiving device 112, for example, sends an image input signal of a real image obtained by an image-taking unit to the mobile information terminal 400.

The hardware configuration of the input device 200a is similar to the hardware configuration of the input device 200 of the first embodiment except that the input device 200a does not include the third sending/receiving device 208 and further includes a sixth sending/receiving device 213. The sixth sending/receiving device 213 is a close-range wireless sending/receiving device such as Bluetooth (registered trademark) or infrared. The sixth sending/receiving device 213 sends/receives information to/from the mobile information terminal 400. More specifically, the sixth sending/ receiving device 213, for example, sends an operation (e.g., zoom operation) input signal input in an input unit by a user, to the mobile information terminal 400.

The HMD 100b does not include the first sending/receiving device 108, and the input device 200a does not include the second sending/receiving device. Because of this, the HMD 100b do not send/receive information to/from the input device 200a directly, and vice versa. The HMD 100b sends/receives information to/from the input device 200a via the mobile information terminal 400, and vice versa.

The mobile information terminal 400 includes a CPU 401 and a built-in power source 407. The mobile information terminal 400 further includes a memory 402, a display unit 403, an input unit 404, a seventh sending/receiving device 405, an eighth sending/receiving device 406, and a ninth sending/receiving device 408, each of which is connected to the CPU 401.

The CPU 401 executes various processes as function units described in the above embodiment in accordance with programs stored in the memory 402.

The seventh sending/receiving device 405 is a medium/low-speed close-range wireless sending/receiving device such as, for example, Bluetooth (registered trademark). The seventh sending/receiving device 405 sends/receives information to/from the HMD 100b. More specifically, the seventh sending/receiving device 405, for example, sends an image output signal of virtual information to be displayed by a display unit of the HMD 100b, to the HMD 100b.

The eighth sending/receiving device 406 is a close-range wireless sending/receiving device such as Bluetooth (registered trademark) or infrared. The eighth sending/receiving device 406 sends/receives information to/from the input device 200a. More specifically, the eighth sending/receiving device 406, for example, sends a change signal to the input device 200a. The change signal is used to change a pattern of a graphic as a marker projected by the input device 200a.

The ninth sending/receiving device 408 is a medium-range wireless sending/receiving device such as, for example, 3G (3rd Generation) or WiMAX (Worldwide Interoperability for Microwave Access, registered trademark). The ninth sending/receiving device 408, for example, connects the network N such as the Internet or LAN (Local Area Network), and downloads content to be displayed as virtual information.

Note that the fifth sending/receiving device 112 of the HMD 100b or the seventh sending/receiving device 405 of the mobile information terminal 400 may be a wired sending/receiving device.

MODIFIED EXAMPLE 3

Figure 12:
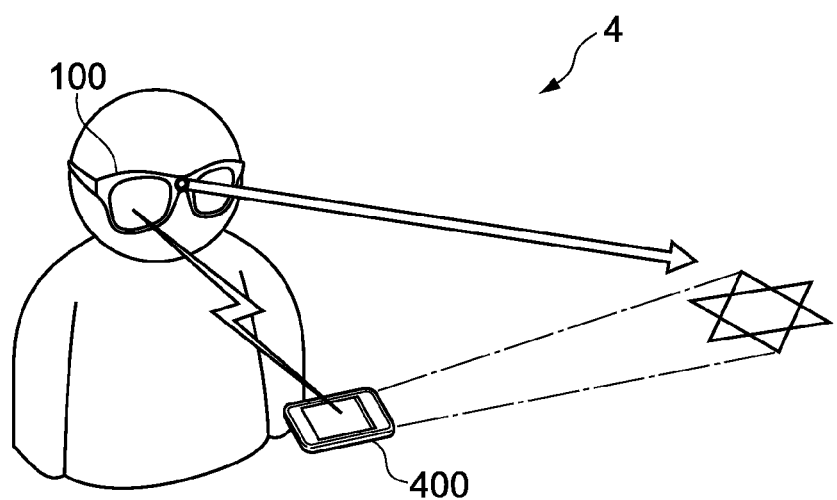
FIG. 12 is a schematic diagram showing an information processing system according to a modified example 3.

FIG. 12 is a schematic diagram showing an information processing system 4 according to the modified example 3.

The hardware configuration of the information processing system 4 of this modified example is similar to the hardware configuration (FIG. 2) of the information processing system 1 of the first embodiment.

In the above embodiment, the CPU in the HMD executes the main process. To the contrary, in the information processing system 4 of this modified example, a mobile information terminal as the input device 200 executes the main process. For example, a smartphone or a handheld game machine may be employed as the mobile information terminal.

The first sending/receiving device 108 of the HMD 100, for example, sends an image input signal of a real image obtained by the image-taking unit 101 to the input device (mobile information terminal) 200.

The third sending/receiving device 208 of the input device (mobile information terminal) 200, for example, sends an image output signal of virtual information to be displayed by the display unit 102 of the HMD 100, to the HMD 100.

The CPU 212 of the input device (mobile information terminal) 200 executes various processes in accordance with programs stored in the memory 205 as the function units described in the above embodiment.

Note that, in a case where the display unit 102 and the image-taking unit 101 are mounted in one apparatus (HMD 100), a superimposition parameter is corrected (Step S110) based on positional relation between the HMD 100 and the input device 200.

MODIFIED EXAMPLE 4

Figure 13:
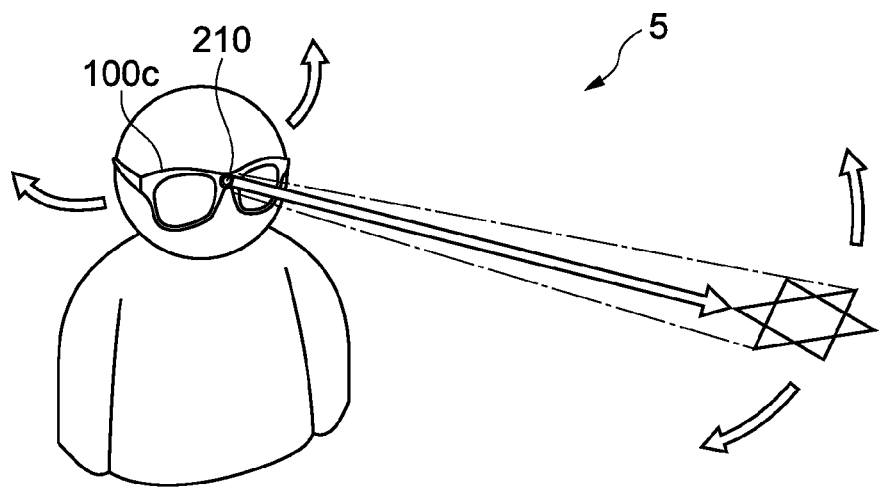
FIG. 13 is a schematic diagram showing an information processing system according to a modified example 4.
Figure 14:
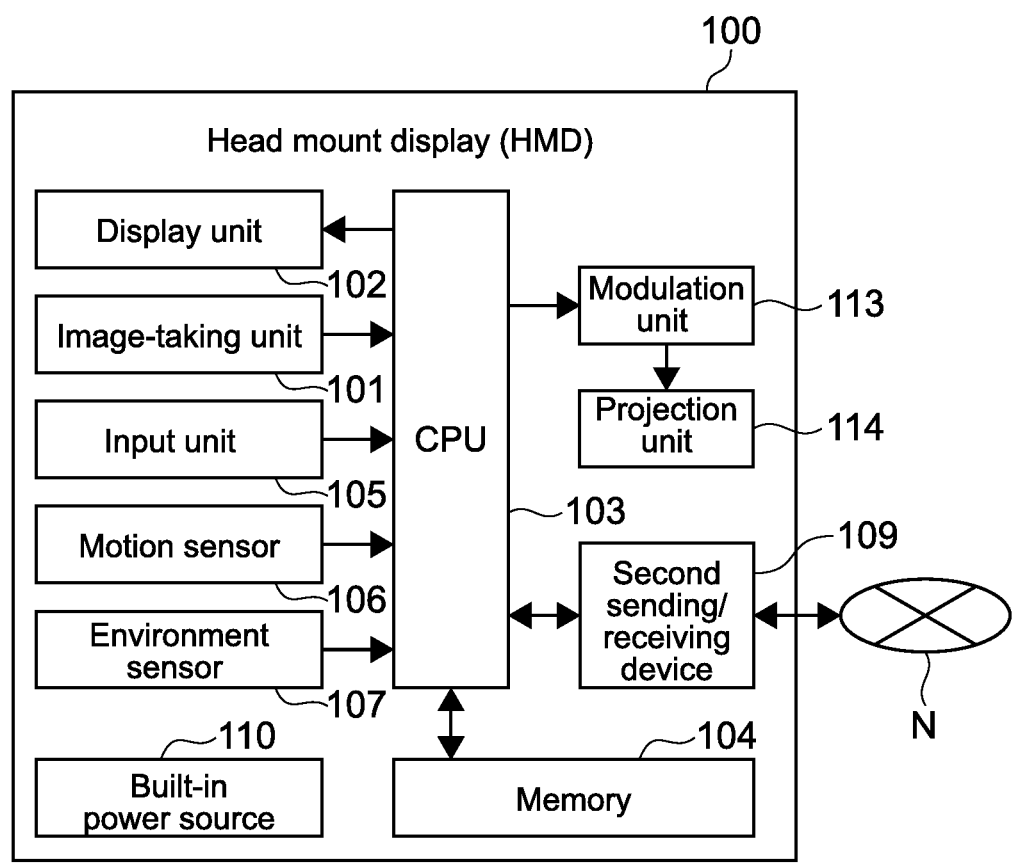
FIG. 14 is a block diagram showing the hardware configuration of the information processing system according to the modified example 4.

FIG. 13 is a schematic diagram showing an information processing system 5 according to the modified example 4. FIG. 14 is a block diagram showing the hardware configuration of the information processing system 5 according to the modified example 4.

According to the above embodiment, a marker is projected and an operation to virtual information is input by using the input device 200 independent of the HMD 100. To the contrary, according to this modified example, an input device is not provided separately. Only an HMD 100c executes all the behaviors including projection of a marker and input of an operation to virtual information.

The hardware configuration of the HMD 100c is similar to the hardware configuration of the HMD 100 of the first embodiment except that the HMD 100c does not include the first sending/receiving device 108, and further includes a modulation unit 113 connected to the CPU 103 and a projection unit 114 connected to the modulation unit 113. The modulation unit 113 has a function similar to the function of the modulation unit 209 of the input device 200 of the above embodiment. The projection unit 114 has a function similar to the function of the projection unit 210 of the input device 200 of the above embodiment.

A user wears the HMD 100c and moves his head to thereby control virtual information. For example, a user moves his head up/down/right/left to thereby move the projection position of a marker. As a result, it is possible to move (drag) the display position of the displayed virtual information.

THE MODIFIED EXAMPLE 5

Figure 15:
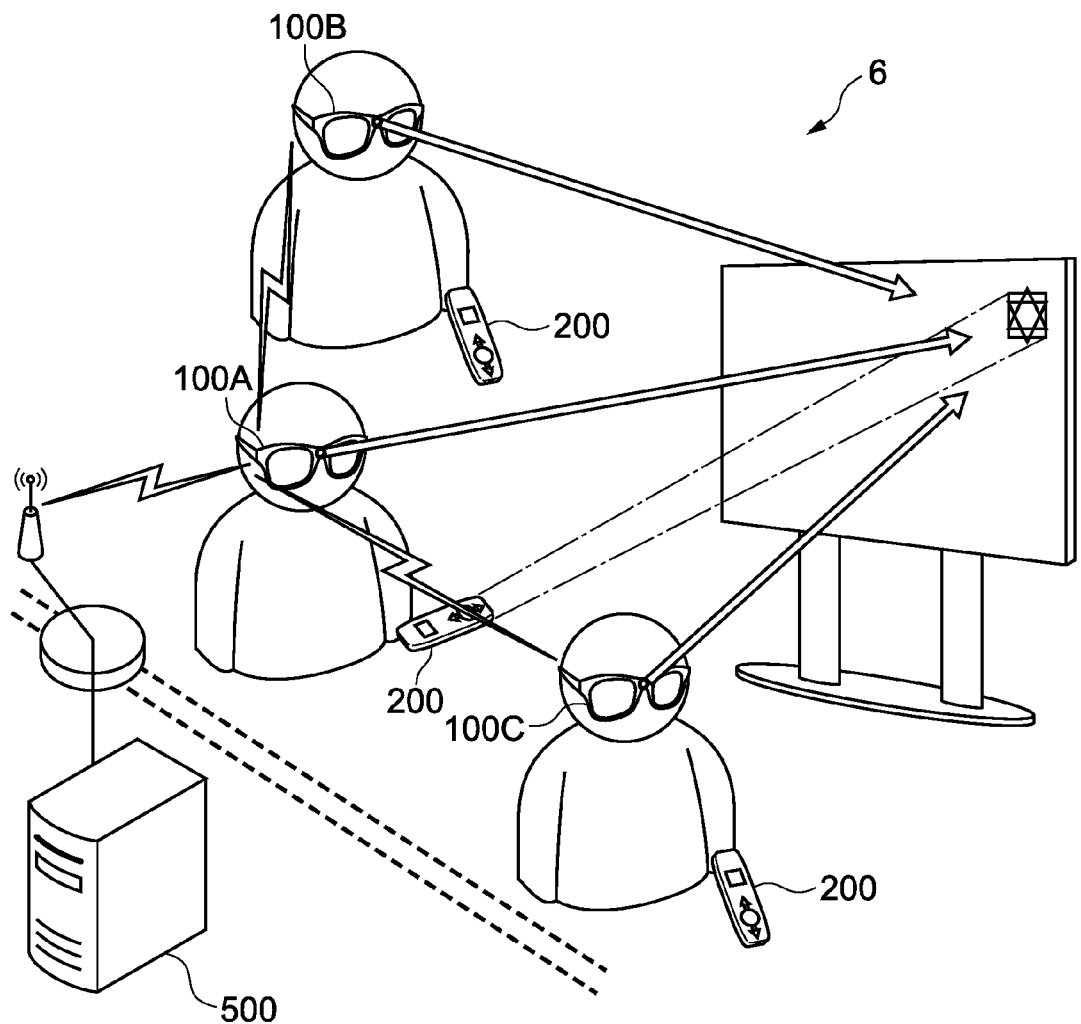
FIG. 15 is a schematic diagram showing an information processing system according to a modified example 5.

FIG. 15 is a schematic diagram showing an information processing system 6 according to the modified example 5.

The information processing system 6 includes a plurality of HMDs 100A, 100B, 100C, a plurality of input devices 200, and a server apparatus 500. The server apparatus 500 holds content data of content to be displayed as virtual information.

The projection HMD 100A searches the server apparatus 500 for content data of content to be displayed as virtual information via a wireless or wired LAN (Local Area Network), and obtains the content data. The projection HMD 100A supplies content data obtained from the server apparatus 500 to the non-projection HMDs 100B, 100C by using a close-range wireless sending/receiving device (fourth sending/receiving device 111). As a result, the projection HMD 100A and the non-projection HMDs 100B, 100C are capable of displaying the same content as virtual information.

MODIFIED EXAMPLE 6

Figure 16:
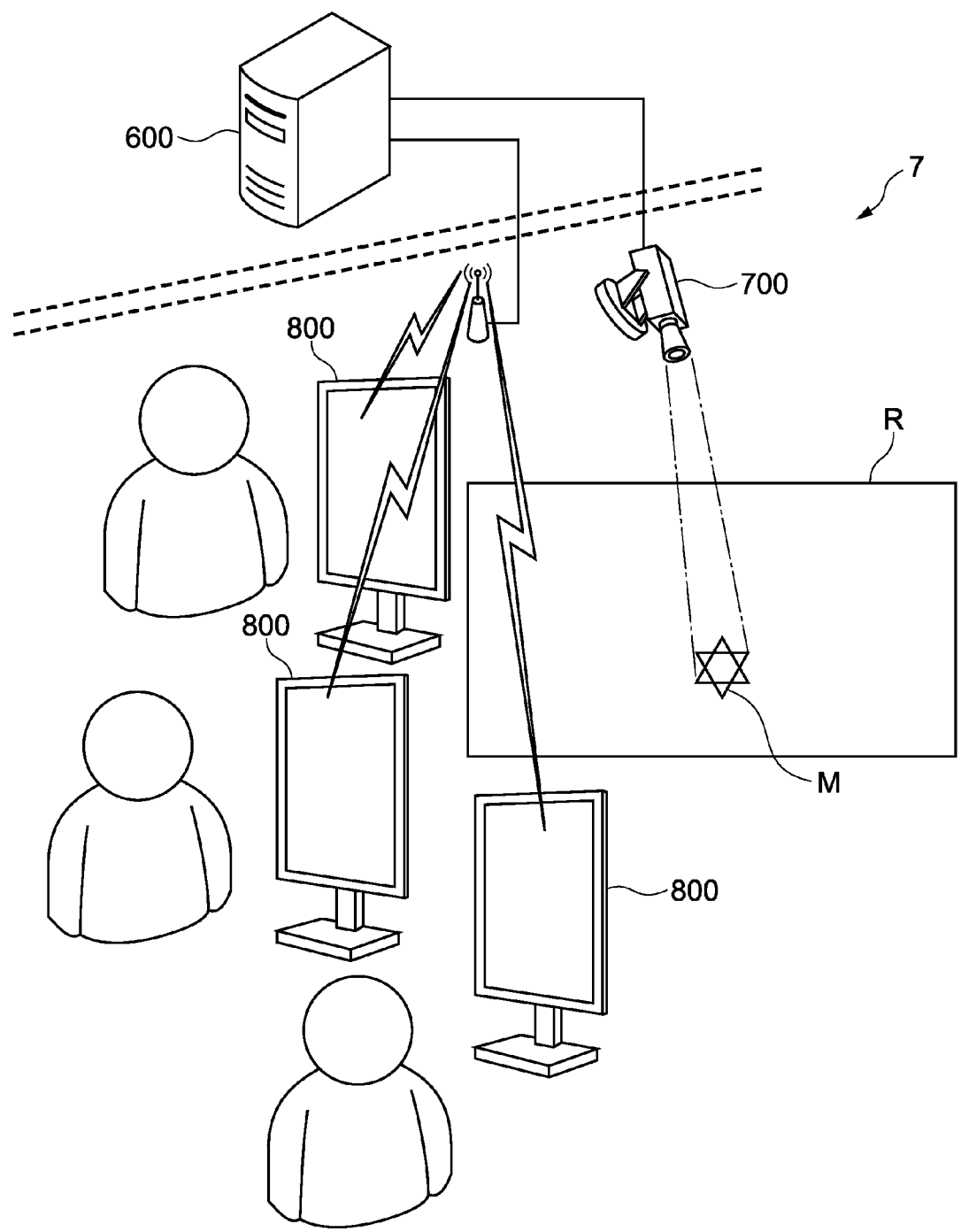
FIG. 16 is a schematic diagram showing an information processing system according to a modified example 6.

FIG. 16 is a schematic diagram showing an information processing system 7 according to the modified example 6.

The information processing system 7 includes a main processor apparatus 600, a projection/image-taking device 700, and at least one display device 800.

The main processor apparatus 600 instructs the projection/image-taking device 700 about the shape of a marker M to be projected, the location of the marker M in real scenery S, and the like via close-range wireless or wired communication. Further, the main processor apparatus 600 obtains real image data from the projection/image-taking device 700. The main processor apparatus 600 calculates object image data of virtual information based on the obtained real image data. The main processor apparatus 600 superimposes the calculated object image data on real image data to thereby generate display data. The main processor apparatus 600 supplies the generated display data to the plurality of display devices 800 via wireless communication.

The projection/image-taking device 700 projects the marker M on the real scenery S. A stationary camera of the projection/image-taking device 700 takes an image of the real scenery S to thereby obtain real image data. The projection/image-taking device 700 supplies the obtained real image data to the main processor apparatus 600.

The display device 800 displays display data obtained from the main processor apparatus 600. The display device 800 is, for example, an HUD (Head-Up Display). Specifically, a digital signage, a transparent display that may be installed on a desk or on a dashboard of a car, a display of a mobile information terminal, or the like may be employed as an HUD.

MODIFIED EXAMPLE 7

A non-visible region (infrared, ultraviolet, etc.) laser may be used as a light source for projecting a marker. As a result, it is possible not to allow a user who does not wear an HMD to visually recognize a marker and virtual information. Meanwhile, a user who wears an HMD is capable of visually recognizing virtual information. Further, a display unit of an HMD may be processed such that a non-visible region (infrared, ultraviolet, etc.) laser is visually recognizable. As a result, a user who wears an HMD is capable of visually recognizing a marker.

Note that the present application may employ the following configurations.

(1) An information processing apparatus, comprising:
an image-taking unit configured to take an image of real scenery to thereby obtain real image;
a marker-detecting unit configured to extract a marker image from the real image, the marker image being an image of marker projection light, the marker projection light being projected by a projection device to the real scenery in order to provide spatial first information, the first information being necessary to display virtual information such that the virtual information is superimposed on the real scenery, second information being added to the marker projection light; and
an extracting unit configured to extract the second information added to the extracted marker image.

(2) The information processing apparatus according to (1), wherein
a measurable characteristic is added to the marker projection light as the second information, and
the extracting unit is configured
to measure the characteristic based on an image of the marker projection light, and
to extract the second information.

(3) The information processing apparatus according to (1) or (2), wherein
the measurable characteristic of the marker projection light is at least one of light intensity (amplitude), wavelength (frequency), and blinking periods.

(4) The information processing apparatus according to any one of (1) to (3), further comprising
an image generating unit configured to generate, based on the first information, an image of virtual information displayed such that the virtual information is superimposed on the real scenery.

(5) The information processing apparatus according to any one of (1) to (4), wherein
the second information is identification information uniquely identifying the projection device,
the extracting unit is configured to determine if the extracted identification information indicates that the projection device projects a display target of virtual information, and
the image generating unit generates, if the extracting unit determines that the extracted identification information indicates that the projection device projects a display target of virtual information, an image of the virtual information.

(6) The information processing apparatus according to any one of (1) to (5), further comprising
a filter capable of detecting a characteristic of the marker projection light, wherein
the marker-detecting unit is configured to detect a marker image from the filtered real image.

(7) The information processing apparatus according to any one of (1) to (6), further comprising
a display unit configured to display an image of the virtual information such that the image of the virtual information is superimposed on the real scenery.

(8) The information processing apparatus according to any one of (1) to (7), wherein
the second information is configuration changing information of virtual information displayed such that the virtual information is superimposed on the real scenery, and
the image generating unit is configured to generate an image of the virtual information based on the configuration changing information of virtual information extracted by the extracting unit.

(9) The information processing apparatus according to any one of (1) to (8), further comprising
a filter capable of detecting a characteristic of the marker projection light, wherein
the marker-detecting unit is configured to detect a marker image from the filtered real image.

(10) The information processing apparatus according to any one of (1) to (9), further comprising
a display unit configured to display an image of the virtual information such that the image of the virtual information is superimposed on the real scenery.

It should be understood that various changes and modifications to the presently preferred embodiments described herein will be apparent to those skilled in the art. Such The invention is claimed as follows:

1. An information processing apparatus, comprising:
a Central Processing Unit (CPU) configured to:
control an image sensor to take an image of a real scenery to obtain a real image;
detect a marker image from the obtained real image, the marker image being an image of marker projection light projected by a projection device to the real scenery,
wherein the marker image includes a first information that includes a spatial information associated with a virtual information displayed on a display device and the virtual information is superimposed on the real image, and
wherein the projection device adds a second information to the marker projection light; and
extract the second information added to the marker projection light,
wherein the second information comprises at least one of intensity or wavelength of the marker image as configuration changing information to change a configuration of the virtual information superimposed on the real image, and wherein the configuration of the virtual information comprises a size of the virtual information displayed on the display device.

2. The information processing apparatus according to claim 1, wherein
the at least one of the intensity or wavelength of the marker image is added to the marker projection light as the second information, and
the CPU is further configured to:
measure the at least one of the intensity or wavelength of the marker image; and
extract the second information.

3. The information processing apparatus according to claim 1, wherein the CPU is further configured to
generate, based on the first information, an image of the virtual information displayed such that the virtual information is superimposed on the real scenery.

4. The information processing apparatus according to claim 1, wherein
the second information comprises an identification information to uniquely identify the projection device,
the CPU is further configured to:
determine whether the identification information indicates that the projection device projects a display target of the virtual information; and
generate the image of the virtual information based on the determination that the identification information indicates that the projection device projects the display target of the virtual information.

5. The information processing apparatus according to claim 2, further comprising
a filter configured to detect the at least one of the intensity or wavelength of the marker image.

6. The information processing apparatus according to claim 1, further comprising
the display device configured to display the image of the virtual information such that the image of the virtual information is superimposed on the real scenery.

7. The information processing apparatus according to claim 1, wherein
the CPU is further configured to generate the image of the virtual information based on the configuration changing information of the virtual information.

8. The information processing apparatus according to claim 7, further comprising
a filter configured to detect a characteristic of the marker projection light.

9. The information processing apparatus according to claim 8, further comprising
the display device configured to display the image of the virtual information such that the image of the virtual information is superimposed on the real scenery.

10. The information processing apparatus according to claim 1, wherein the CPU is further configured to send the second information to the projection device, the second information being added to the marker projection light,
wherein the second information is obtained by modulation of the second information into the marker projection light, the second information being received by the projection device from the information processing apparatus, and
wherein the CPU is further configured to demodulate the second information added to the marker projection light.

11. The information processing apparatus according to claim 1, wherein
the second information comprises location information specifying a location, wherein object data to be displayed as the virtual information is stored in the location, and
the CPU is further configured to obtain, based on the location information, the object data to be displayed as the virtual information.

12. The information processing apparatus according to claim 11, further comprising
a filter configured to detect a characteristic of the marker projection light.

13. The information processing apparatus according to claim 12, further comprising
the display device configured to display the image of the virtual information such that the image of the virtual information is superimposed on the real scenery.

14. The information processing apparatus according to claim 1, wherein the configuration of the virtual information further comprises display position of the virtual information and an angle of the virtual information.

15. The information processing apparatus according to claim 1, wherein the second information comprises the intensity of the marker image as the configuration changing information to change the configuration of the virtual information superimposed on the real image.

16. The information processing apparatus according to claim 1, wherein the second information comprises the wavelength of the marker image as the configuration changing information to change the configuration of the virtual information superimposed on the real image.

17. An information processing method, comprising:
taking, by an image sensor, an image of a real scenery to obtain a real image;
detecting a marker image from the obtained real image, the marker image being an image of marker projection light projected by a projection device to the real scenery,
wherein the marker image includes a first information that includes a spatial information associated with a virtual information displayed on a display device and the virtual information is superimposed on the real image;

adding, by the projection device, a second information to the marker projection light; and extracting the second information added to the marker projection light, wherein the second information comprises at least one of intensity or wavelength of the marker image as configuration changing information to change a configuration of the virtual information superimposed on the real image, and wherein the configuration of the virtual information comprises a size of the virtual information displayed on the display device.

18. An information processing system, comprising:

a projection device configured to project a marker to a real scenery; and an information processing apparatus, including:
  a Central Processing Unit (CPU) configured to:
    control an image sensor to take an image of the real scenery to obtain a real image;
    detect a marker image from the obtained real image, the marker image being an image of the marker projected by the projection device to the real scenery,
    wherein the marker image includes a first information that includes a spatial information associated with a virtual information displayed on a display device and the virtual information is superimposed on the real image,
    wherein the projection device adds a second information to the marker projection light; and
    extract the second information added to the marker projection light, wherein the second information comprises at least one of intensity or wavelength of the marker image as configuration changing information to change a configuration of the virtual information superimposed on the real image, and wherein the configuration of the virtual information comprises a size of the virtual information displayed on the display device.

19. The information processing system according to claim 18, wherein the CPU is further configured to send the second information to the projection device, the second information being added to the marker projection light, wherein the projection device:
  receives the second information from the information processing apparatus; and
  modulates the second information received into the marker projection light, and wherein the CPU is further configured to demodulate the second information added to the marker projection light.

* * * * *